(12) United States Patent
Toda

(10) Patent No.: US 7,809,750 B2
(45) Date of Patent: Oct. 5, 2010

(54) DATA MANAGEMENT APPARATUS THAT CONTROLS A DATA STORAGE APPARATUS BY TRANSMITTING COMMAND OF STRUCTURED DOCUMENT FORMAT

(75) Inventor: Takahisa Toda, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 609 days.

(21) Appl. No.: 10/443,754

(22) Filed: May 23, 2003

(65) Prior Publication Data

US 2004/0030693 A1 Feb. 12, 2004

(30) Foreign Application Priority Data

May 23, 2002 (JP) .............................. 2002-149121
May 21, 2003 (JP) .............................. 2003-143548

(51) Int. Cl.
*G06F 17/30* (2006.01)
(52) U.S. Cl. ...................... 707/783; 707/821; 714/699
(58) Field of Classification Search ................ 709/223; 707/3, 783, 821; 714/699
See application file for complete search history.

(56) References Cited

U.S. PATENT DOCUMENTS

| | | | | |
|---|---|---|---|---|
| 6,212,535 | B1 * | 4/2001 | Weikart et al. ............... | 715/207 |
| 6,675,299 | B2 * | 1/2004 | Porter et al. .................. | 726/26 |
| 7,054,854 | B1 | 5/2006 | Hattori et al. | |
| 2001/0018697 | A1 | 8/2001 | Kunitake et al. | |
| 2002/0032790 | A1 * | 3/2002 | Linderman .................. | 709/230 |
| 2002/0191223 | A1 * | 12/2002 | Ishikawa ..................... | 358/402 |
| 2003/0014512 | A1 * | 1/2003 | Tanimoto ..................... | 709/223 |
| 2003/0133148 | A1 * | 7/2003 | Tachiyama .................. | 358/1.15 |
| 2003/0200285 | A1 * | 10/2003 | Hansen et al. .............. | 709/220 |
| 2008/0092234 | A1 * | 4/2008 | Circenis ...................... | 726/21 |

FOREIGN PATENT DOCUMENTS

| | | |
|---|---|---|
| JP | 2000-122952 | 4/2000 |
| JP | 2001-51987 | 2/2001 |
| JP | 2001-209641 | 8/2001 |
| JP | 2002-32385 | 1/2002 |
| JP | 2002-101451 | 4/2002 |
| WO | WO 99/57839 | 11/1999 |
| WO | WO 01/98936 A2 | 12/2001 |

OTHER PUBLICATIONS

Kernighan et al., The C programming language, $2^{nd}$ edition, Prentice Hall PTR, 1988, pp. 153-155.*

* cited by examiner

*Primary Examiner*—Cheyne D Ly
(74) *Attorney, Agent, or Firm*—Oblon, Spivak, McClelland, Maier & Neustadt. L.L.P.

(57) ABSTRACT

A data management apparatus connected to a data storage apparatus via a network manages the data storage apparatus by transmitting a command of structured document format such as the extensible markup language format and receiving the information related to the executed command as response data of the structured document format. Since the information included in the command is expressed using the structured document format, the data storage apparatus can flexibly interpret the command by ignoring missing and excess information included in the command, and vice versa.

24 Claims, 32 Drawing Sheets

FIG.6

```
POST /Netfile HTTP/1.0
Content-Type: text/xml; charset=UTF-8

<?xml version="1.0" encoding="UTF-8"?>
<operation>
   <getList>
      <application>print</application>
      <maxNumber>20</maxNumber>
      <sortParam>
         <keyType>creationDate</keyType>
   </getList>
</operation>
```

FIG.7

```
<?xml version="1.0" encoding="UTF-8"?>
<operationResult>
    <getListResult>
        <IsSucceeded>false</isSucceeded>
        <result>
            <error>
                <errorType>invalidValue</errorType>
                <fileID>10</fileID>
            </error>
        </result>
    </getListResult>
</operationResult>
```

FIG.8

```
HTTP/1.0 200 OK
Content-Type: text/xml; charset=UTF-8

<?xml version="1.0" encoding="UTF-8"?>
<operationResult>
    <getListResult>
        <IsSucceeded>true</isSucceeded>
        <result>
            <filelist>
                <fileID>10</fileID>
                <fileID>20</fileID>
                      :
            </filelist>
        </result>
    </getListResult>
</operationResult>
```

FIG.13

```
POST /Netfile HTTP/1.0
Content-Type: text/xml; charset=UTF-8
Content-Length:nnn <?xml version="1.0" encoding="UTF-8"?>
<operation>
    <reprint>
        <targetFile>
            <fileID>10</fileID>
            <password>xxxx</password>
        </targetFile>
        <targetFile>
            <fileID>20</fileID>
        </targetFile>
        <copyVolume>2</copyVolume>
    </reprint>
</operation>
```

FIG.14

```
<?xml version="1.0" encoding="UTF-8"?>
<operationResult>
   <reprintResult>
      <isSucceeded>false</isSucceeded>
      <result>
         <error>
            <errorType>fileNotFound</errorType>
            <fileID>10</fileID>
         </error>
      </result>
   </reprintResult>
</operationResult>
```

FIG.15

```xml
<?xml version="1.0" encoding="UTF-8"?>
<operationResult>
    <reprintResult>
        <IsSucceeded>true</isSucceeded>
        <description>Print request is accepted.</description>
        <result>
            <request>
                <requested>1000</requested>
                <hosted>xxx.xxx.xxx.xxx<hosted>
                <operation>
                    <reprint>
                        <targetFile>
                            <fileID>10</fileID>
                        </targetFile>
                        <targetFile>
                            <fileID>20</fileID>
                        </targetFile>
                        <copyVolume>2</copyVolume>
                    </reprint>
                </operation>
                <status>Wating</status>
            </request>
        </result>
    </reprintResult>
</operationResult>
```

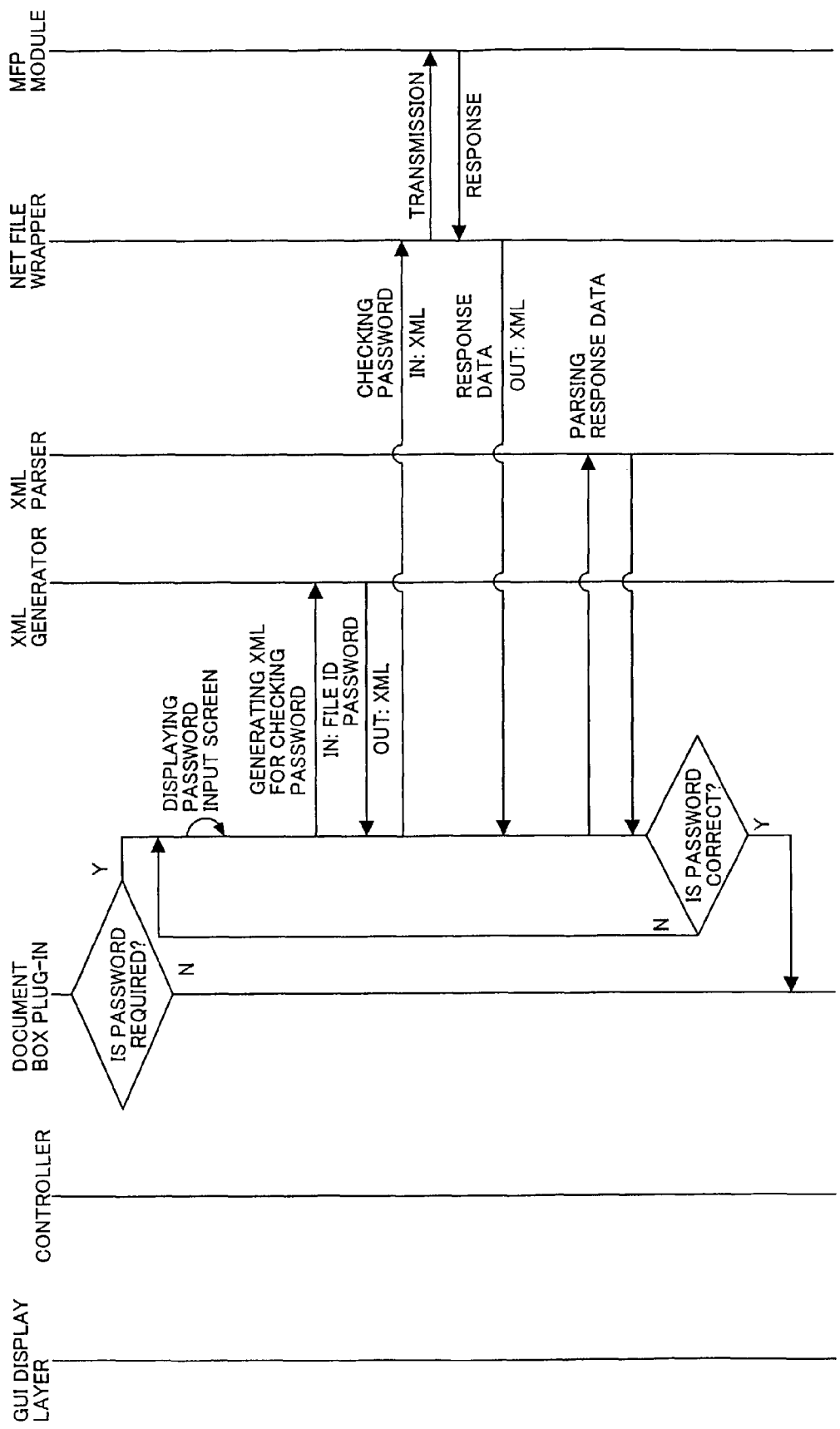

FIG.17

```
┌─────────────────────────────────────────────────────────┐
│ TRANSMITTING STORED DOCUMENT BY FACSIMILE               │
├─────────────────────────────────────────────────────────┤
│                                                         │
│   DESTINATION OF TRANSMISSION        ┌──────────────┐   │
│   ┌──────────────────────┐           │ TRANSMISSION │   │
│   │ xxxx-yyyy            │           └──────────────┘   │
│   └──────────────────────┘           ┌──────────────┐   │
│              ┌──────────────────┐    │    CANCEL    │   │
│              │ NEXT DESTINATION │    └──────────────┘   │
│              └──────────────────┘    ┌──────────────┐   │
│   LIST OF DESTINATIONS               │     HELP     │   │
│   ┌──────────────────────┐           └──────────────┘   │
│   │ xxxx-yyyy            │                              │
│   │ aaaa-bbbb            │                              │
│   └──────────────────────┘                              │
│              ┌────────────────────┐                     │
│              │ DELETING FROM LIST │                     │
│              └────────────────────┘                     │
│                                                         │
└─────────────────────────────────────────────────────────┘
```

FIG.19

```
POST /Netfile HTTP/1.0
Content-Type: text/xml; charset=UTF-8
Content-Length:nnn <?xml version="1.0" encoding="UTF-8"?>
<operation>
    <sendFax>
        <targetFile>
            <fileID>10</fileID>
            <password>xxxx</password>
        </targetFile>
        <targetFile>
            <fileID>20</fileID>
        </targetFile>
        <receiver>
            <receiverID>03-xxxx-yyyy</receiverID>
        </receiver>
    </sendFax>
</operation>
```

FIG.20

```xml
<?xml version="1.0" encoding="UTF-8"?>
<operationResult>
    <sendFaxResult>
        <IsSucceeded>true</isSucceeded>
        <result>
            <error>
                <errorType>fileNotFound</errorType>
                <fileID>10</fileID>
            </error>
        </result>
    </sendFaxResult>
</operationResult>
```

FIG.21

```xml
<?xml version="1.0" encoding="UTF-8"?>
<operationResult>
    <sendFaxResult>
        <IsSucceeded>true</isSucceeded>
        <description>Fax request is accepted.</description>
        <result>
            <request>
                <requesID>1000</requestID>
                <hostID>xxx.xxx.xxx.xxx<hostID>
                <operation>
                    <sendFax>
                        <targetFile>
                            <fileID>10</fileID>
                        </targetFile>
                        <targetFile>
                            <fileID>20</fileID>
                        </targetFile>
                        <receiver>
                            <receiverID>03-xxxx-yyyy</receiverID>
                        </receiver>
                    </sendFax>
                </operation>
                <status>Wating</status>
            </request>
        </result>
    </sendFaxResult>
</operationResult>
```

FIG.23

| DISTRIBUTING SCANNED DOCUMENT TO SERVER |
|---|

DESTINATION OF DISTRIBUTION xxxx

NEXT DESTINATION

TRANSMISSION

CANCEL

HELP

LIST OF TRAY ID xxxx
aaaa

DELETING FROM LIST

FIG.25

```
POST /Netfile HTTP/1.0
Content-Type: text/xml; charset=UTF-8
Content-Length:nnn <?xml version="1.0" encoding="UTF-8"?>
<operation>
    <distScan>
        <targetFile>
            <fileID>10</fileID>
            <password>xxxx</password>
        </targetFile>
        <targetFile>
            <fileID>20</fileID>
        </targetFile>
        <tray>
            <tray ID>xxxx </ tray ID>
        </ tray >
    </ distScan >
</operation>
```

FIG.26

```xml
<?xml version="1.0" encoding="UTF-8"?>
<operationResult>
    <distScanResult>
        <IsSucceeded>true</isSucceeded>
        <result>
            <error>
                <errorType>fileNotFound</errorType>
                <fileID>10</fileID>
            </error>
        </result>
    </distScanResult>
</operationResult>
```

FIG.27

```xml
<?xml version="1.0" encoding="UTF-8"?>
<operationResult>
    <distScanResult>
        <IsSucceeded>true</isSucceeded>
        <description>Distribution request is accepted.</description>
        <result>
            <request>
                <requesID>1000</requestID>
                <hostID>xxx.xxx.xxx.xxx<hostID>
                <operation>
                    <distScan>
                        <targetFile>
                            <fileID>10</fileID>
                        </targetFile>
                        <targetFile>
                            <fileID>20</fileID>
                        </targetFile>
                        <tray>
                            <trayID>xxxx </trayID>
                        </tray>
                    </distScan>
                </operation>
            </request>
        </result>
    </distScanResult>
</operationResult>
```

DATA MANAGEMENT APPARATUS THAT CONTROLS A DATA STORAGE APPARATUS BY TRANSMITTING COMMAND OF STRUCTURED DOCUMENT FORMAT

BACKGROUND OF THE INVENTION

1. Field of the Invention

The present invention generally relates to a data management apparatus, and more particularly, to a data management apparatus that causes a data storage apparatus to handle data stored therein, a computer program that causes a computer to function as such a data management apparatus, and a computer readable recording medium storing such a computer program. The present invention further relates to a data storage apparatus controlled by the data management apparatus, a data management system including such a data storage apparatus and a data management apparatus, and a method of controlling a data storage apparatus.

2. Description of the Related Art

Conventionally, document management servers, for example, are well-known as data storage apparatuses that store data such as documents, transmit stored data to users, and print stored data using printers. Digital multifunctional apparatuses that have been recently developed are other examples of such data storage apparatuses. The digital multifunctional apparatus (MFP), for example, stores data in large-capacity nonvolatile storage means provided therein, and can print the stored data as a printer and transmit the stored data as a facsimile machine. Besides such functions, the digital multifunctional apparatus (MFP) may be able to scan documents as a scanner, and print the scanned data as a copier.

The data storage apparatus may form a data management system with a data management apparatus connected via a network. In this case, the data management apparatus can control the data storage apparatus by transmitting commands thereto. In response to reception of the commands, the data storage apparatus operates as a printer, a copier, a facsimile machine, and a scanner, for example.

Conventionally, a command set is designed for each model of data storage apparatus. Both the data storage apparatus and the data management apparatus need to be provided with computer programs that support the command set. Otherwise, the data management apparatus cannot control the data storage apparatus as desired.

The same command set needs to be supported by both the data storage apparatus and the data management apparatus. If the command set supported by the data storage apparatus and the command set supported by the data management apparatus differ, the difference may cause problems. In the case in which a new command is introduced into the command set of the data management apparatus, for example, the computer program of the data storage apparatus needs to be updated. Otherwise, when the data management apparatus transmits the newly introduced command to the data storage apparatus, the data storage apparatus cannot respond to the command.

In the case in which a command included in the command set of the data storage apparatus is updated and a data item is no longer required in the command, the data storage apparatus may fail to execute the conventional command transmitted by the data management apparatus because the conventional command includes the data item.

Accordingly, it is difficult to update the command set and to port a command set developed for one model of data storage apparatus to another model. Software engineers need to make a lot of effort to keep the command set supported by the data storage apparatus and the command set supported by the data management apparatus compatible.

If the command set of the data storage apparatus and the command set of the data management apparatus are to be maintained compatible, when the command set of the data storage apparatus is updated, the command set of the data management apparatus needs to be updated at the same time. This may require additional effort and even unnecessary investment from users of the data management system. The more data management apparatuses are connected to the data storage apparatus, the more evident this problem becomes.

SUMMARY OF THE INVENTION

Accordingly, it is an object of the present invention to provide a data management apparatus in which at least one of the above problems is eliminated, and more particularly, to provide a data management apparatus that can control a data storage apparatus efficiently, a computer program that causes a computer to function as the data management apparatus, and a computer readable recording medium storing the computer program.

To achieve one of the above objects, a data management apparatus, according to the present invention, connected to a data storage apparatus via a network, includes means for generating a command of structured document format for said data storage apparatus; means for transmitting the generated command to said data storage apparatus; means for receiving response data of said structured document format transmitted by said data storage apparatus in response to reception of the transmitted command; and means for interpreting the received response data.

The data management apparatus manages the data storage apparatus by transmitting a command of structured document format such as the extensible markup language (XML) format to the data storage apparatus and receiving the response data of the structured document format against the transmitted command from the data storage apparatus, the response data including information indicating the result of the execution of the command.

Since the command and the response data contain information expressed using the structured document format, the data management apparatus and the data storage apparatus can identify information items that they need to obtain. If an information item that the data management apparatus and the data storage apparatus need to obtain is not contained, such an information item is treated as missing and is ignored. If an information item that the data management apparatus and the data storage apparatus do not need to obtain is contained, such an information item is simply ignored.

Accordingly, the teachings of the present invention improve the compatibility between the data storage apparatus and the data management apparatus, and make addition of new functions easy. The design and improvement of the data management system becomes easy.

Other objects, features, and advantages of the present invention will become more apparent from the following detailed description when read in conjunction with the accompanying drawings.

BRIEF DESCRIPTION OF THE DRAWINGS

FIG. 6 illustrates a command in which a PC requests an MFP to transmit a document list according to an embodiment;

FIG. 7 illustrates a response from an MFP in the case in which the command of FIG. 6 is erroneously processed according to an embodiment;

FIG. 8 illustrates a response from an MFP in the case in which the command of FIG. 6 is successfully processed according to an embodiment;

FIG. 13 illustrates a command in which a PC requests an MFP to print a stored document according to an embodiment;

FIG. 14 illustrates a response from an MFP in the case in which the command of FIG. 13 is erroneously processed according to an embodiment;

FIG. 15 illustrates a response from an MFP in the case in which the command of FIG. 13 is successfully processed according to an embodiment;

FIGS. 16A, 16B, and 16C are a continuous series of schematic diagrams showing the operation of computer programs according to an embodiment in the case in which a PC requests an MFP to transmit a stored document via facsimile;

FIG. 17 illustrates a transmission condition setting screen according to an embodiment;

FIG. 19 illustrates a facsimile transmission command according to an embodiment;

FIG. 20 illustrates response data to the facsimile transmission command of FIG. 19 according to an embodiment;

FIG. 21 illustrates response data according to an embodiment in the case in which the facsimile transmission command of FIG. 19 is successfully processed;

FIG. 23 illustrates a distribution condition setting screen according to an embodiment;

FIG. 25 illustrates a scanner distribution command according to an embodiment;

FIG. 26 illustrates response data to the scanner distribution command of FIG. 23 according to an embodiment; and FIG. 27 illustrates response data according to an embodiment in the case in which the scanner distribution command of FIG. 19 is successfully processed.

DETAILED DESCRIPTION OF THE PREFERRED EMBODIMENTS

Preferred embodiments of the present invention are described below with reference to the drawings.

Figure 1:
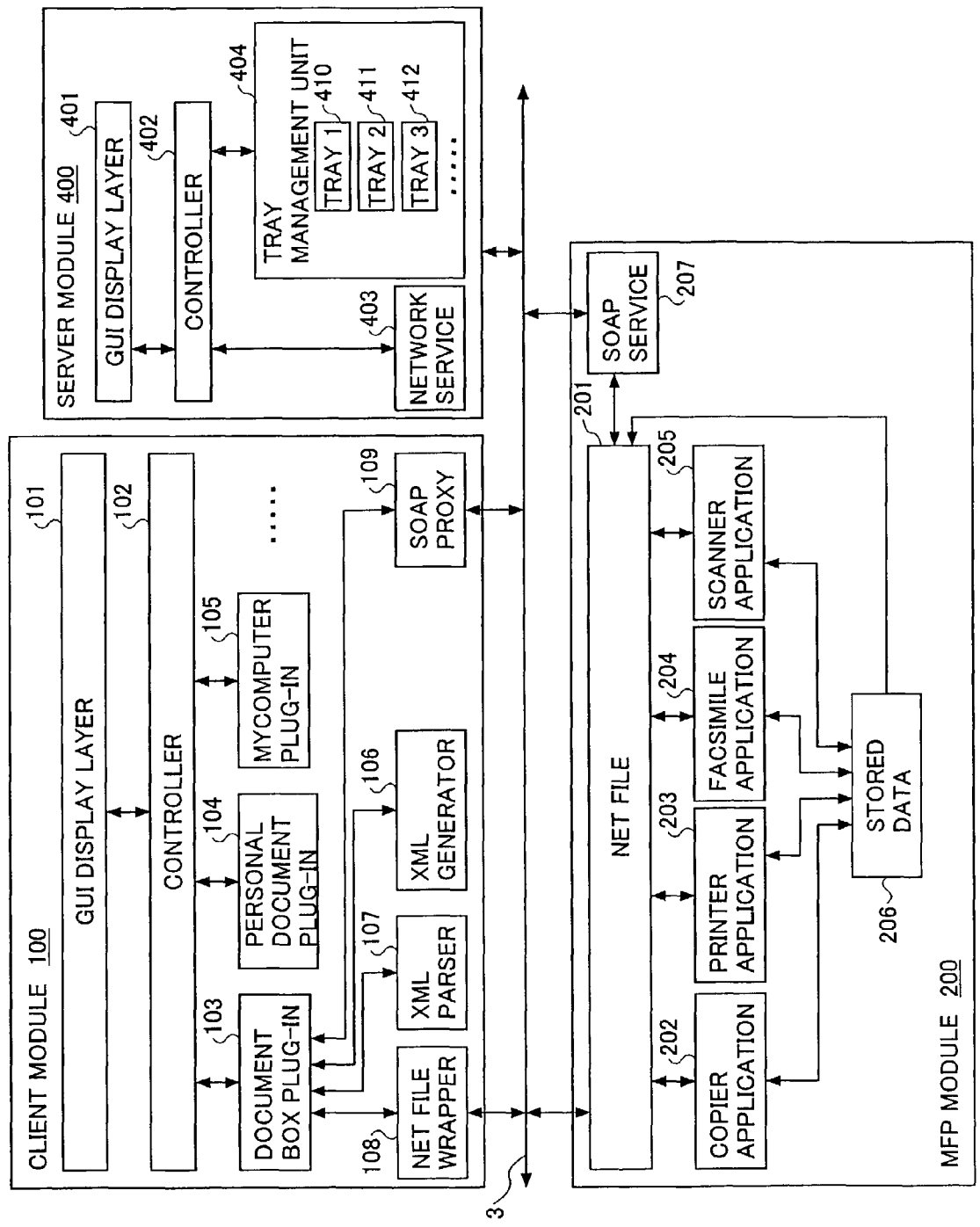
FIG. 1 is a block diagram showing the software structure of a data management system according to an embodiment of the present invention.
Figure 2:
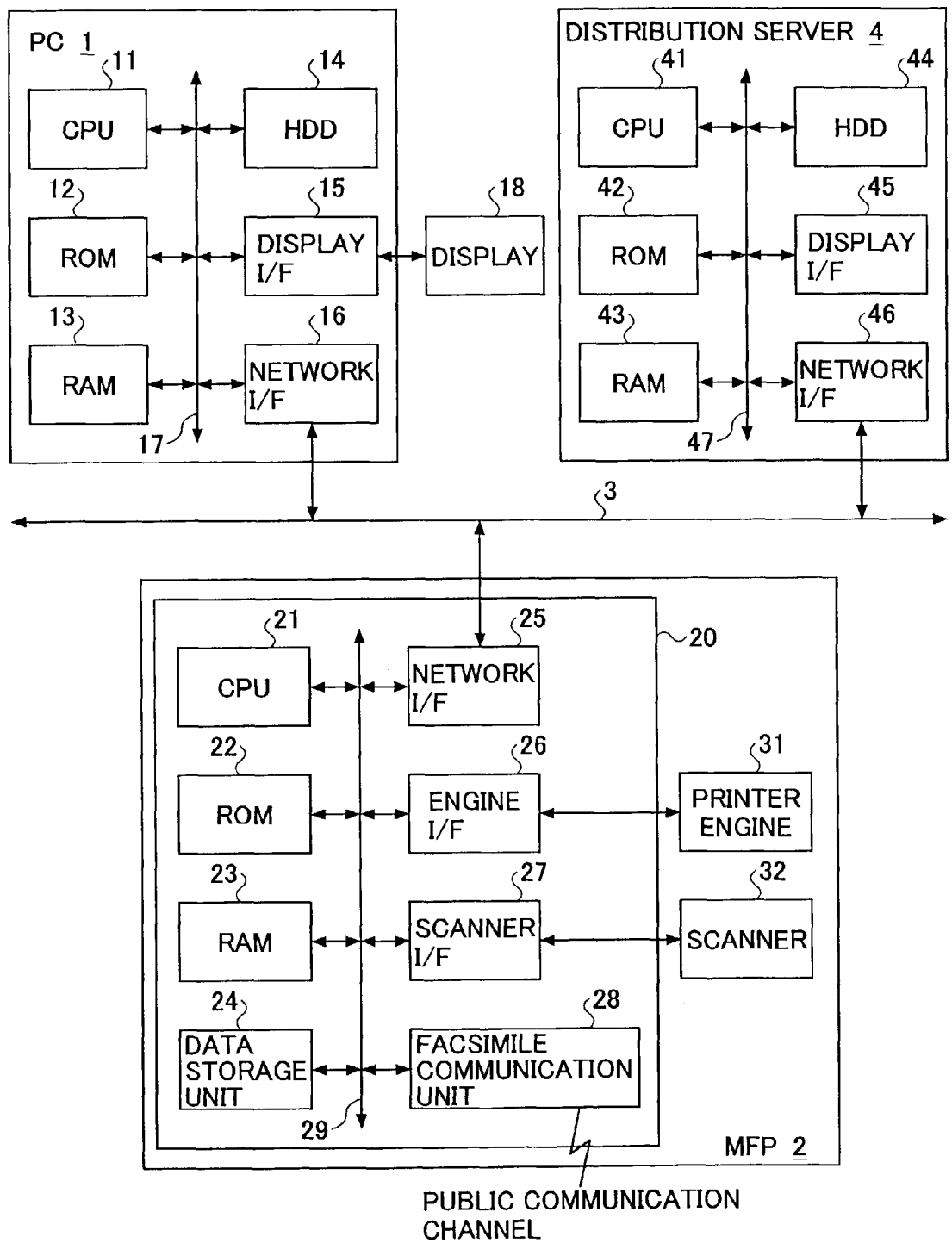
FIG. 2 is a block diagram showing the hardware structure of the data management system according to an embodiment.

A data management system according to an embodiment of the present invention is described first. FIG. 1 is a schematic diagram showing the software configuration of the data management system, and FIG. 2 is a block diagram showing the hardware of the data management system.

This data management system includes the following: a personal computer (PC) 1 as a data management apparatus, a digital multifunctional apparatus (MFP) 2 as a data storage apparatus, and a distribution server 4, all of them being connected via a network 3. The MFP 2 stores data (document) and, in response to a command from the PC 1, processes the document. In response to a user's request, the PC 1 transmits various commands to the MFP 2. The distribution server 4 has a plurality of trays in which the user can store his/her data. The network 3 is, for example, a local area network (LAN), but it may be an intranet or the Internet. The network 3 may be wired or wireless.

The hardware configuration of the PC 1 is that of an ordinary personal computer. It may include a CPU 11, ROM 12, RAM 13, a hard disk drive (HDD) 14, a display interface (I/F) 15, and a network I/F 16, all connected via a system bus. The PC 1 is connected to the network 3.

The user can install various application programs in the HDD 14. The PC 1 performs various functions by running the application programs. A client module 100 is one of the application programs installable to the PC 1. The client module 100 causes the PC 1 to function as a client apparatus of the data management system according to the embodiment. Specifically, the CPU 11 of the PC 1 functions as various means that will be described later.

The PC 1 is provided with a display 18 connected to the display I/F 15. The user can input information to the PC 1 through a graphical user interface (GUI) shown on the display 18, and obtain information such as the result of operations shown on the display 18. The display unit 18 is, for example, an liquid crystal display monitor that is publicly known. The display 18 may be built into the PC 1.

The PC 1 is provided with an operation unit (not shown) such as a keyboard and a mouse through which the user can operate the PC 1.

The MFP 2 is provided with a control unit 20, a printer engine 31, and a scanner engine 32. The control unit 20 includes a CPU 21, ROM 22, RAM 23, data storage unit 24, a network I/F 25, an engine I/F 26, a scanner I/F 27, and facsimile (FAX) communication unit 28, all connected via a system bus 29.

ROM 22 stores various control programs including the MFP module 200 shown in FIG. 1. CPU 21 runs the various control programs, and causes the printer engine 31 to form an image, the scanner engine 32 to scan a document, and the facsimile communication unit 28 to transmit image information, for example. The CPU 21 interprets commands from the PC 1 received via the network I/F 25. In response to reception of the commands, the CPU 21 performs corresponding operations, and/or returns responses to the commands.

ROM 22 stores various control programs including the MFP module 200. If the ROM 22 is rewritable memory such as a flash memory, it becomes easy to update the control program and add new commands and new functions. RAM 23 provides a working memory area to the CPU 21, and temporarily stores data.

The data storage unit 24 stores data such as documents, and consists of a large-capacity nonvolatile storage device such as a hard disk drive (HDD). For example, image information scanned by the scanner engine 32, image information received by the facsimile communication unit 28, and document data received by the network I/F 25 from the PC 1 are stored in the data storage unit 24. The data storage unit 24 may store a portion of the programs run by the CPU 21.

The network I/F 25 is an interface to connect the MFP 2 to the network 3. An engine I/F 26 and a scanner I/F 27 are interfaces to connect the printer engine 31 and the scanner engine 32, respectively, to the control unit 20.

A facsimile communication unit 28 includes a network control unit (not shown) and a facsimile modem (not shown), for example, and communicates with another facsimile device via a public channel.

The printer engine 31 is an image forming unit that prints images on sheets of paper based on given printer data. The scanner engine 32 reads images printed or written on a document at a predetermined resolution and converts them into image data.

As described above, the MFP 2 has multiple functions such as a printer function, scanner function, copier function, and facsimile function. In response to commands from the PC 1 and user's requests given through the operation unit (not shown) the MFP 2 manages data stored in the data storage unit 24, prints the stored data using the printer engine 31, and transmits the stored data to another facsimile device using the facsimile communication unit 28, for example.

As is PC 1, the distribution server 4 is provided with a CPU 41, ROM 42, RAM 43, a hard disk drive (HDD) 44, a display interface (I/F) 45, and a network I/F 46, all connected by a system bus 47. That is, the hardware structure of the distribution server 4 is the same as that of an ordinary PC, of which the hardware structure is well-known. The distribution server 4 is also connected to the network 3 through the network I/F 46. An application program (server module 400) is installed in the HDD of the distribution server 4, causes the ordinary PC to function as the distribution server 4. The distribution server 4 can provide users with various services by executing the server module 400 using the CPU.

This distribution server 4 may be provided with a display via the display I/F, and display a graphical user interface (GUI) on the screen of the display. Through the GUI, an operator can give instructions to the server module 400 or determine the result of operations. Although not shown, the distribution server 4 may be provided with an operation unit such as a keyboard and a mouse, through which the operator can give needed instructions to the server module 400.

Computer programs shown in FIG. 1 executed by the PC 1 and the MFP 2 realize the various functions of the data management system according to the embodiment. The computer programs is described below. A description of the distribution server 4 is provided later.

The client module 100 is executed by the PC 1, and causes the PC 1 to function as the data management apparatus. The client module 100 includes, for example, the following: a graphical user interface (GUI) presentation layer 101, a controller 102, a document box plug-in 103, a personal document plug-in 104, a my-computer plug-in 105, an extensible markup language (XML) generator 106, an XML parser 107, a netfile wrapper 108, and a simple object access protocol (SOAP) proxy 109.

The GUI presentation layer 101 displays a graphical user interface (GUI) on the display 18 and receives instructions from the user. For example, the user can select one or more of the stored documents, and give an instruction to print the selected documents through the GUI presentation layer 101.

The controller 102 mediates the exchange of data between the plug-ins and the GUI presentation layer 101.

The document box plug-in 103, the personal document plug-in 104, and the my-computer plug-in 105 are programs for accessing data stored in corresponding storage apparatuses or memory regions. For example, the document box plug-in 103 is a program for accessing data stored in the MFP 2. A plug-in is provided for each storage apparatus, or even for each memory region depending on the case. In the case in which command sets and data formats are different according to the storage apparatus, the plug-in corresponding to the storage apparatus converts the command sets and data formats of the GUI presentation layer 101 into those of the storage apparatus, or vice versa. The plug-ins translate the user's instruction received via the GUI presentation layer 101 into a command that the corresponding storage apparatus can understand, and also translate the response received from the corresponding storage apparatus into data that the controller 102 and/or the GUI presentation layer 101 can understand.

The plug-in can display a GUI on the display 18 without involving the controller 102 and/or the GUI presentation layer 101, and receive the user's instruction directly.

The XML generator 106 is a program that converts given data into data of XML format. The XML generator 106, mainly in response to an instruction from the document box plug-in 103, generates commands of XML format to be transmitted to the MFP 2. The extensible markup language (XML) is an example of a structured document format. The structured document format is a presentation format in which the attributes and structure of data items are indicated by various tags. In the case of XML, it is possible to freely define a new kind of tag and to name the tag, if necessary.

The XML parser 107 is a program that parses data of XML format and converts the data of XML format into data that another program can understand. In this case, the XML parser 107 converts response data that are transmitted from the MFP 2 into data that the document box plug-in 103 can understand.

The netfile wrapper 108 is a program that exchanges data of XML format with another apparatus. For example, the netfile wrapper 108 transmits commands of XML format to a netfile 201 of the MFP module 200, and receives response data of XML format from the netfile 201. Thanks to the netfile wrapper 108, the document box plug-in 103, for example, can communicate with the netfile 201 of the MFP module 200 as if it were located in the client module 100. Accordingly, the document box plug-in 103 does not need to designate the communication counterpart in a complex manner. The Hyper-Text Transfer Protocol (HTTP) can be used for the communication between the netfile wrapper 108 and the netfile 201 of the MFP module 200.

The SOAP proxy 109 is a program that exchanges data of XML format between the PC 1 and another apparatus using the Simple Object Access Protocol (SOAP). The SOAP proxy 109 inserts commands of XML format generated by the XML generator 106 into SOAP envelopes and transmits them to a SOAP service 207 of the MFP module 200 via the network 3 as SOAP messages. The SOAP proxy 109 receives SOAP messages from the SOAP service 207 of the MFP module 200, and transfers response data of XML format included in the received SOAP messages to the document box plug-in 103. If the SOAP protocol based on the standard technique of the Internet is used, problems of conventional distributed object techniques such as architecture-dependency can be solved.

In the case in which a user desires to print a document stored in the MFP 2 and gives an instruction to the client module 100 through the GUI displayed by the GUI presentation layer 101, the GUI presentation layer 101 transfers the instruction to the controller 102. The controller 102 transfers the instruction to the document box plug-in 103 for accessing the data stored in the MFP 2. The document box plug-in 103 displays a GUI to let the user input a password or printing condition, if necessary. The document box plug-in 103 causes the XML generator 106 to generate a command of XML format based on the user's input, and transmits the command to the MFP module 200 running in the MFP 2 through the netfile wrapper 108.

Once the MFP 2 processes the command, response data are returned to the document box plug-in 103 via the netfile wrapper 108. The document box plug-in 103 then has the XML parser 107 parse the response data of XML format into data that the controller 102 can understand, and transfer the data to the controller 102. If the data include information that the user needs to be informed of, the controller 102 transfers the data to the GUI presentation layer 101 and has the GUI presentation layer 101 display the information. Accordingly, the client module 100 can cause another apparatus (the MFP 2 in this case) to operate as the user desires, and inform the user of the result of the operation of the other apparatus. The document box plug-in 103 may display the result on the display 18 directly.

Although not shown, each plug-in is provided with a plurality of XML generators 106, XML parsers 107, netfile wrappers 108, and SOAP proxies 109 depending on the commands, the response data, and the destinations of communication.

The MFP module 200 is a program run by the MFP 2 and causes the MFP 2 to function as a data storage apparatus. The MFP module 200 includes the netfile 201, SOAP service 207, and application programs such as a copier application 202, a printer application 203, a facsimile application 204, and a scanner application 205.

The netfile 201 is a program that provides various services to the client apparatus (the PC 1 in this case). The netfile 201 receives all commands directed to the application programs, and activates the application programs based on the received command. The netfile 201 transmits response data in response to the commands.

The SOAP service 207 is a program that receives the SOAP message transmitted by the SOAP proxy 109 of the client module 100, and transfers data of XML format stored in the received SOAP message. The SOAP service 207 also inserts data of XML format received from the netfile 201 into a SOAP envelope, and transmits the SOAP envelope to the SOAP proxy 109 of the client module 100.

The copier application 202, the printer application 203, the facsimile application 204, and the scanner application 205 are application programs that cause the MFP 2 to function as a copier, a printer, a facsimile machine, and a scanner, respectively, by controlling the engines and the communication unit of the MFP 2. The printer application 203, for example, can print stored data 206 stored in the data storage unit 24. The facsimile application 204, for example, can transmit the stored data 206 by facsimile. As described above, the application programs can process the stored data stored in the data storage unit 24.

In response to a command provided from the PC 1, the MFP module 200 can activate one or more of the application programs, and control, output, or transmit data such as a document stored in the data storage unit 24.

[Obtaining Document List]

The case in which PC 1 obtains the list of documents stored in the stored data 206 of MFP 2 is described below. PC 1 requests the list from MFP 2, and MFP 2 transmits the list to PC 1.

Figure 3:
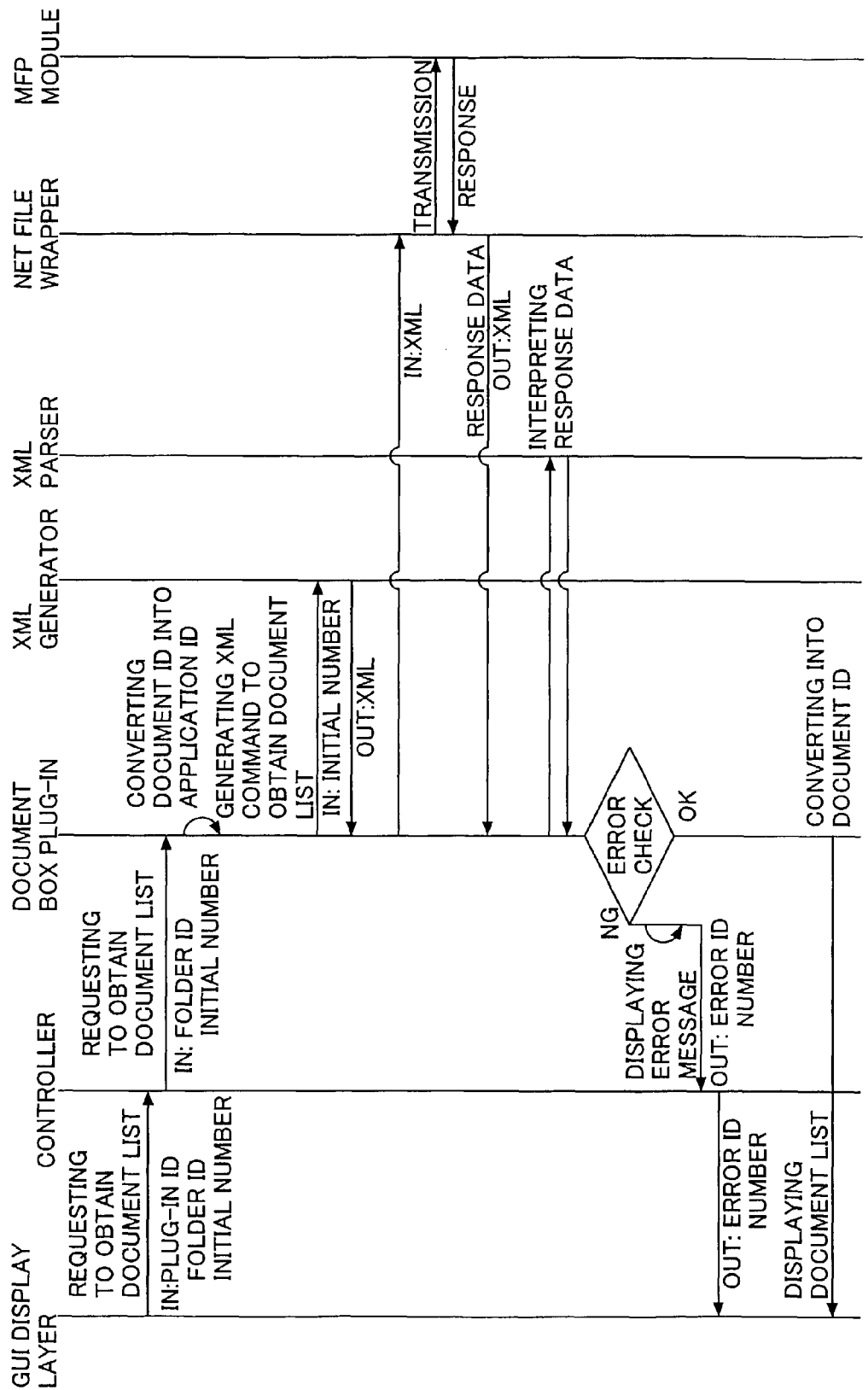
FIG. 3 is a schematic diagram showing the operation of computer programs in the case in which a PC requests an MFP to transmit a document list according to an embodiment.
Figure 4:
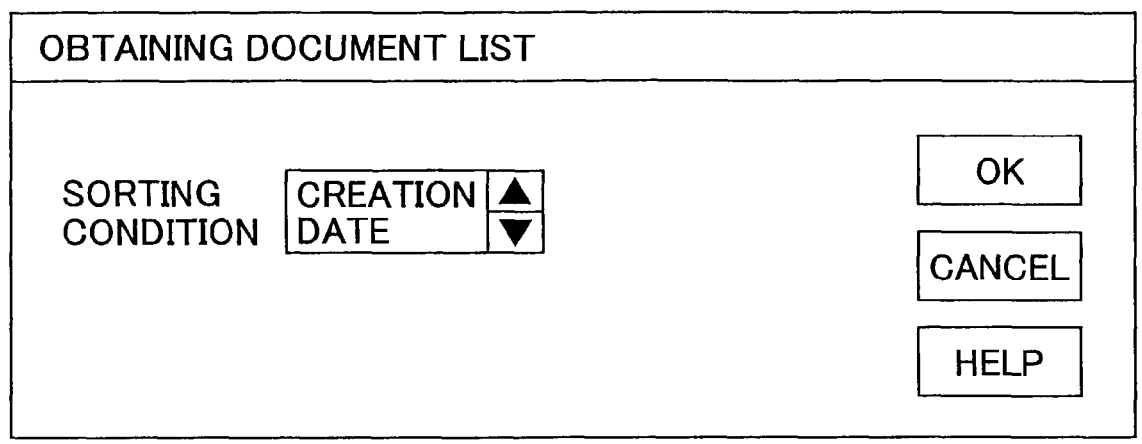
FIG. 4 illustrates an obtaining condition setting screen according to an embodiment.
Figure 5:
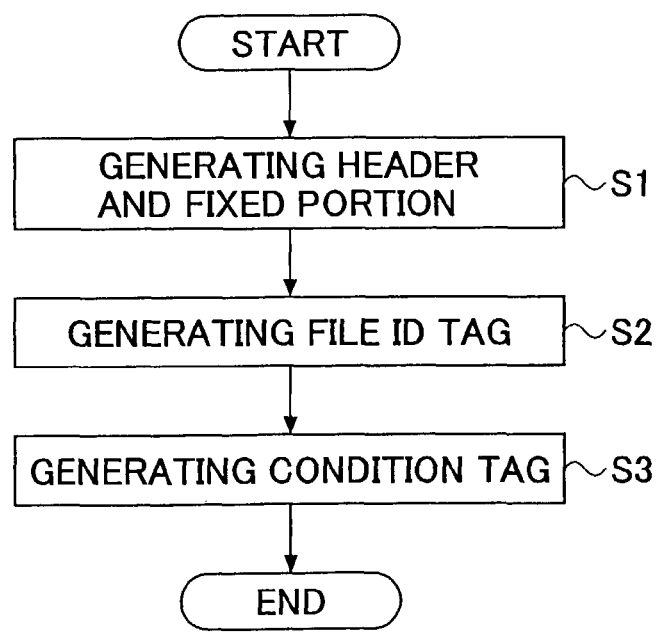
FIG. 5 is a flow chart showing the generating of a command according to an embodiment.

FIG. 3 is a schematic diagram showing the operation of programs in the case in which PC 1 generates a command for obtaining the document list from MFP 2. FIG. 4 is a schematic diagram of a screen that PC 1 displays to let the user input various conditions. FIG. 5 is a flow chart showing the generation of the command for obtaining the document list. FIG. 6 illustrates the command for obtaining the document list. FIG. 7 illustrates response data that MFP 2 returns to PC 1 in the case in which MFP 2 fails to process the command. FIG. 8 illustrates response data that MFP 2 returns to PC 1 in the case in which MFP 2 successfully processes the command.

In the data management system showed in FIGS. 1 and 2, the user can obtain the document list of documents stored in the data storage unit 24 of MFP 2 by operating PC 1, and can display the document list on the display 18 of PC 1. In this case, each program of the client module 100 performs processing showed in FIG. 3. In FIG. 3, processing flows in the downward direction, and the arrows indicate that data are exchanged between the programs.

In response to the user's operation, the GUI presentation layer 101 transfers the instruction for obtaining the document list to the controller 102. The GUI presentation layer 101 simultaneously transfers a plug-in ID for accessing an apparatus storing the document to be obtained (MFP 2 in this case), a folder ID indicating the folder of the documents to be obtained, and related information such as the initial number of the documents to be obtained. In response to reception of the instruction and the above information, the controller 102 gives an instruction to the plug-in designated by the plug-in ID (the document box plug-in 103 in this case) to obtain the document list of the stored document of MFP 2. The controller 102 transfers the above information such as the folder ID and the initial number of the documents simultaneously.

The document box plug-in 103 converts the folder ID into an application ID. The folder ID and the application ID are identification information for identifying an application of MFP 2 such as the copier application 202, the printer application 203, the facsimile application 204, and the scanner application 205. PC 1 identifies each application of MFP 2 as a folder corresponding one to one. The document box plug-in 103 converts the folder ID into the corresponding application ID and transfers it to MFP 2.

After converting the folder ID into the application ID, the document box plug-in 103 displays the condition setting screen on the display 18 to let the user set various conditions related to the obtaining of the document list. FIG. 4 shows a screen requesting the user to input the sorting condition of the document list.

When the user sets the condition and presses OK button, the document box plug-in 103 transmits the condition, the application ID, and the initial number to the XML generator 106, and has the XML generator generate a command of XML format. The CPU 11 executing the XML generator 106 and the document box plug-in 103 corresponds to means for generating a command.

The document box plug-in 103 transfers the command of XML format generated by the XML generator 106 to the netfile 201 of MFP 2 via the netfile wrapper 108. The CPU 11 executing the netfile wrapper 108 and the document box plug-in 103 corresponds to means for transmitting the generated command.

In the case in which the command of XML format is transmitted as a SOAP message, the document box plug-in 103 transmits the command of XML format generated by the XML generator 106 to the SOAP service 207 of MFP 2 via the SOAP proxy 109 and the network 3. The SOAP service 207 of MFP 2 obtains the command of XML format from the SOAP message received from the SOAP proxy 109, and transfers it to the netfile 201.

In the MFP 2 side, the netfile 201 of MFP module 200 receives the command of XML format, and interprets the contents of the command. The netfile 201 requests the document list from the application program designated by the application ID, and transmits the document list obtained from the application program by including the document list into the response data of XML format. In the case the netfile 201 fails to process the command normally, the netfile 201 sends response data indicating the occurrence of an error to PC 1. In the case in which the netfile 201 successfully process the command, the netfile 201 includes the document file into the response data to be transmitted to PC 1. A request ID may be included in the response data to indicate the corresponding relationship between the command and the response data.

In the PC 1 side, the netfile wrapper 108 receives the response data, and transfers them to the document box plug-in 103. The CPU 11 executing the netfile wrapper 108 and the document box plug-in 103 corresponds to means for receiving response data.

In response to reception of the response data, the document box plug-in 103 has the XML parser 107 parse the response data of XML format. The CPU 11 executing the XML parser 107 and the document box plug-in 103 corresponds to means for interpreting the received response data.

The document box plug-in 103 determines whether the command is successfully processed by checking the response data.

If the response data indicates that MFP 2 failed to process the command, the document box plug-in 103 displays an error message on the display 18. The CPU 11 executing the document box plug-in 103 corresponds to means for displaying the interpreted response data.

The document box plug-in 103 returns an error number included in the response data parsed by the XML parser 107 to the controller 102. The controller 102 returns the error number to the GUI presentation layer 101. Then, the operation of obtaining the document list is over.

If the response data indicate that the command is successfully processed, the document box plug-in 103 obtains the document list included in the response data parsed by the XML parser 107. Since the document list is the list of file IDs with which the netfile 201 of MFP 2 manages the documents, the document box plug-in 103 converts each file ID into a document ID. The document box plug-in 103 has the GUI presentation layer 101 display the converted document list, and the control is retuned. Then the operation of obtaining the document list is over. Although not shown in FIG. 3, a message indicating that the command is normally processed may be displayed on the display 18.

In this case, the CPU 11 executing the document box plug-in 103 also corresponds to means for displaying the interpreted response data.

Accordingly, PC 1 can request MFP 2 to transmit the document list by sending a command of XML format.

The process of generating the command of XML format for requesting MFP 2 to transmit the document list will be described below. The command illustrated in FIG. 6 is an example that obtains the document list of stored documents from file ID 0 through 20 managed by the printer application.

When the command is ready to be generated, the document box plug-in 103 transfers information that is needed for the generation to the XML generator 106, and has the XML generator execute the process of FIG. 5.

In step S1, the XML generator 106 generates the header portion and the fixed portion. The header portion indicates information such as the data format and the protocol to be used for transmission. The first three lines showed in FIG. 6 correspond to the header portion. The fourth and fifth lines and the first and second lines from the bottom, <operation> and <getList> tags, are the fixed portion that is required to be included in the command for requesting to transmit the document list.

In step S2, the application tag <application> and the maximum number of documents tag <maxNumber> are generated. In FIG. 6, the application tag designates the printer application, and the maximum number of documents is 20. In this case, since the document file starts with the file ID "0", the tag indicating the initial document ID number is omitted.

In step S3, the sorting condition tag <sortParam> is generated. The sorting condition designed by this tag is the one that the user selected through the condition setting screen of FIG. 4. The sorting condition tag of FIG. 6 designates the creation data of the document as the sorting key.

The XML generator 106 generates the command of XML format based on information such as the folder ID, the initial document number, and the sorting condition given by the document box plug-in 103.

The process of parsing the response data transmitted by MFP 2 in response to the command for requesting to transmit the document list is described below.

When the command is processed, MFP 2 transmits response data of XML format as showed in FIG. 7 or 8. FIG. 7 illustrates the response data in the case that the command is not processed normally, and FIG. 8 illustrates the response data in the case that the command is processed normally.

Figure 9:
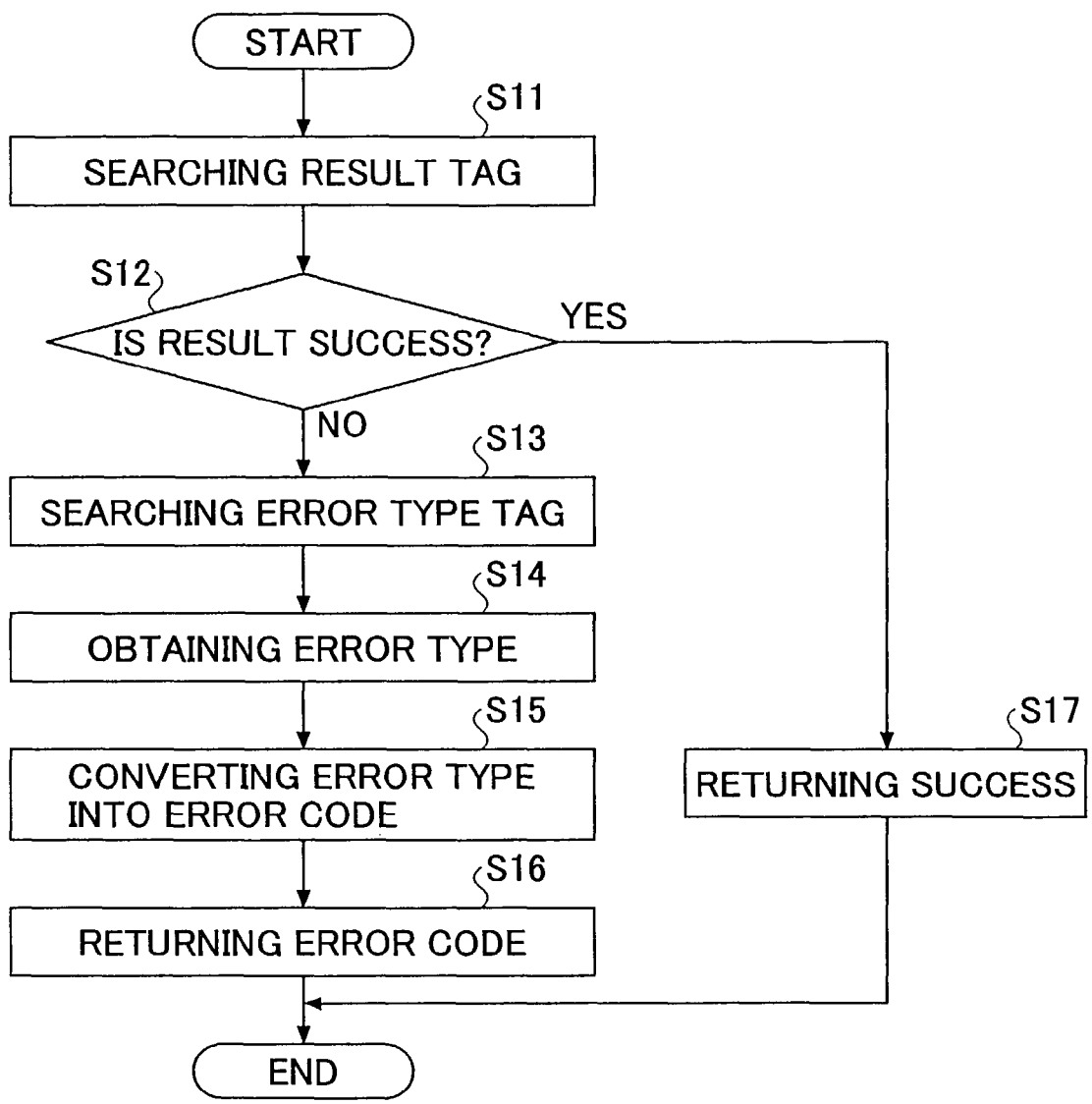
FIG. 9 is a flow chart in which a PC interprets a response from an MFP according to an embodiment.

In response to reception of the response data, the document box plug-in 103 transfers the response data to the XML parser 107, and has the XML parser 107 process the response data as shown in FIG. 9. The flow chart of FIG. 9 shows the process that checks only whether the command is successfully processed or not and, if not successful, which type of error has occurred.

In step S11, the XML parser 107 searches for a result tag. The tag <isSucceeded> of FIGS. 7 and 8 corresponds to the result tag in this case. This tag indicates whether the command has been successfully processed or not.

In step S12, it is determined whether the command has been successfully processed based on the result tag. If the command has not been successfully processed, step 13 is executed. In step S13, an error type tag is searched for. In step S14, the error type is obtained based on the error type tag.

The response data of FIG. 7 contains "invalidvalue" as the element of the <errorType> tag, and "10" as the element of the <fileID> tag indicating the file ID at which the error has occurred.

In step S15, the error type obtained in step S14 is converted into an error code that the document box plug-in 103 can understand. In step S16, the XML parser 107 returns the error code and the file ID to the document box plug-in 103. It is preferred that the controller 102 and the GUI presentation layer 101 be able to understand the error code.

If it is determined that the command has been successfully processed in step S12, the XML parser 107 returns information indicating the successful processing of the command to the document box plug-in 103.

Accordingly, the response data from MFP 2 is interpreted, and the client module 100 can determine whether the command has been successfully processed or not, and if the command has not been processed successfully, the client module 100 (PC 1) can further determine what kind of error occurred.

If necessary, it is possible to obtain more information than the error information by searching for appropriate tags. In the response data of FIG. 8, there are a file list tag <fileList> and a file ID tag <fileID> below the result tag <result>. Those tags indicate the document list represented by the file ID. The document box plug-in 103 obtains the document list represented by the file ID, and converts the file ID into the document ID. Accordingly, the PC 1 can obtain the document list of the documents stored by the printer application of MFP 2.

As described above, in the data management system according to the present invention, the data management apparatus transmits commands written in structured document format (XML in this case) to the data storage apparatus. Accordingly, if the version of the client module 100 (mainly the plug-in portion) and the version of the MFP module 200 (mainly the net file portion) are different, and information included in the command generated by the client module 100 and the information that MFP module 200 can understand (interpret) do not match, the MFP module 200 (the netfile 201) can process the command by using the information included in the command that the MFP module 200 can understand. As a result, MFP 2 can flexibly interpret and process the command transmitted by PC 1.

Since the response data transmitted from MFP 2 to PC 1 are also represented in XML format, if the response data include information that the XML parser 107 of PC 1 cannot interpret, the XML parser 107 can transfer only the information that the XML parser 107 can understand to the document box plug-in 103. Accordingly, the document box plug-in 103 can obtain information that the XML parser 107 can understand to further process the response data. As a result, if only one of the client module 100 and the MFP module 200 is updated, the function available before the updating is guaranteed to continue.

When the command or the response data represented in XML format are interpreted, the elements of understandable tags are used, and the elements of not understandable tags are simply disregarded. If the command or the response data of XML format do not include needed elements, the XML parser 107 or the netfile 201 disregards the absence of the needed elements.

Accordingly, the teachings of the present invention can improve the compatibility between the data storage apparatus and the data management apparatuse, which makes the design and improvement of the data management system easy.

If the interpreted response data are displayed on the display 18, the user can determine whether the command has been successfully processed by MFP 2, and if an error occurs, what kind of error it is, by operating PC 1.

[Printing Stored Document]

The case in which PC 1 transmits a command of XML format to have MFP 2 print a stored document is described below as the second example of operation of the data management system according to an embodiment of the present invention.

Figure 10A:
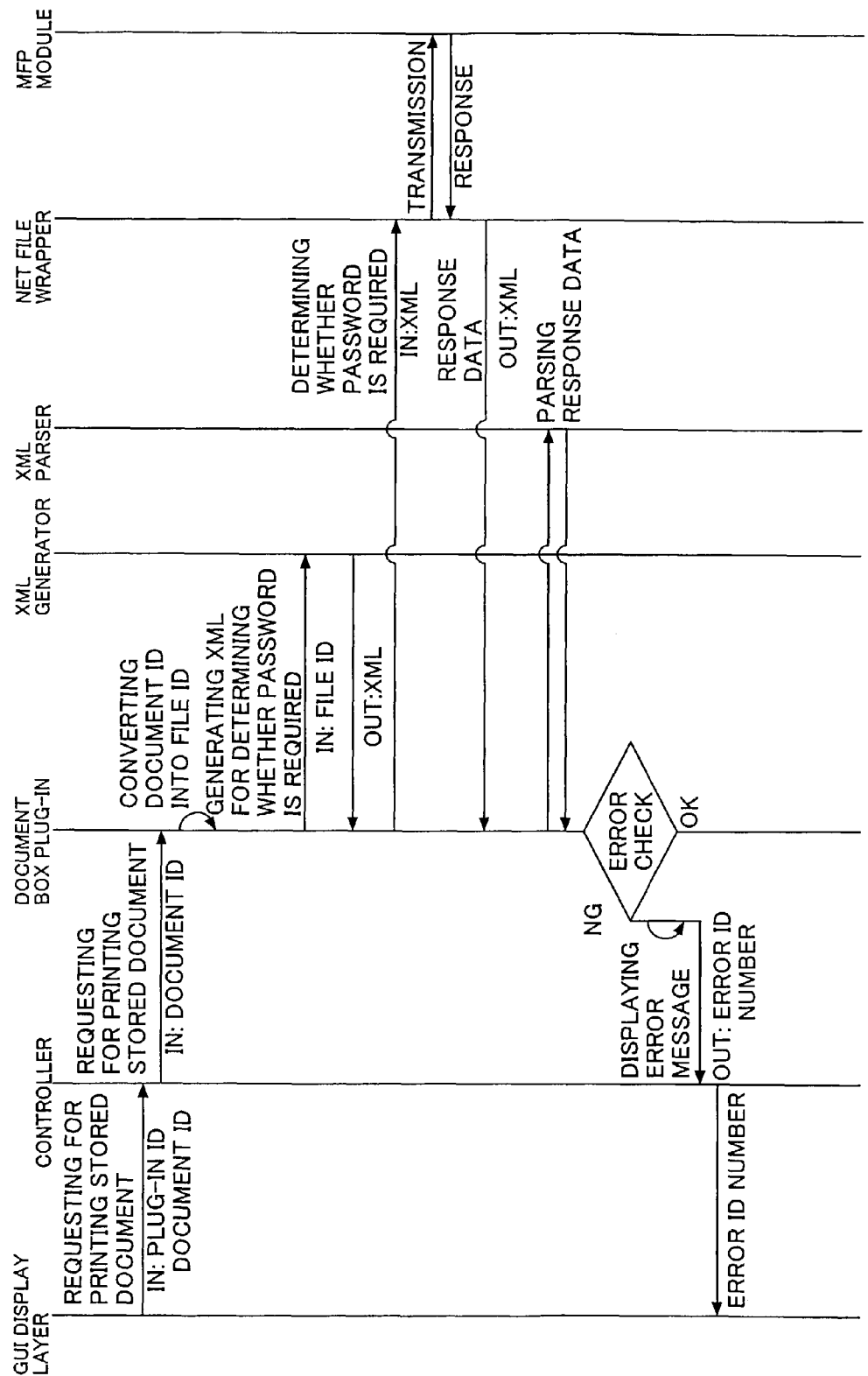
FIGS. 10A, 10B, and 10C are continuous schematic diagrams showing the operation of computer programs in the case in which a PC requests an MFP to print a stored document according to an embodiment.
Figure 10B:
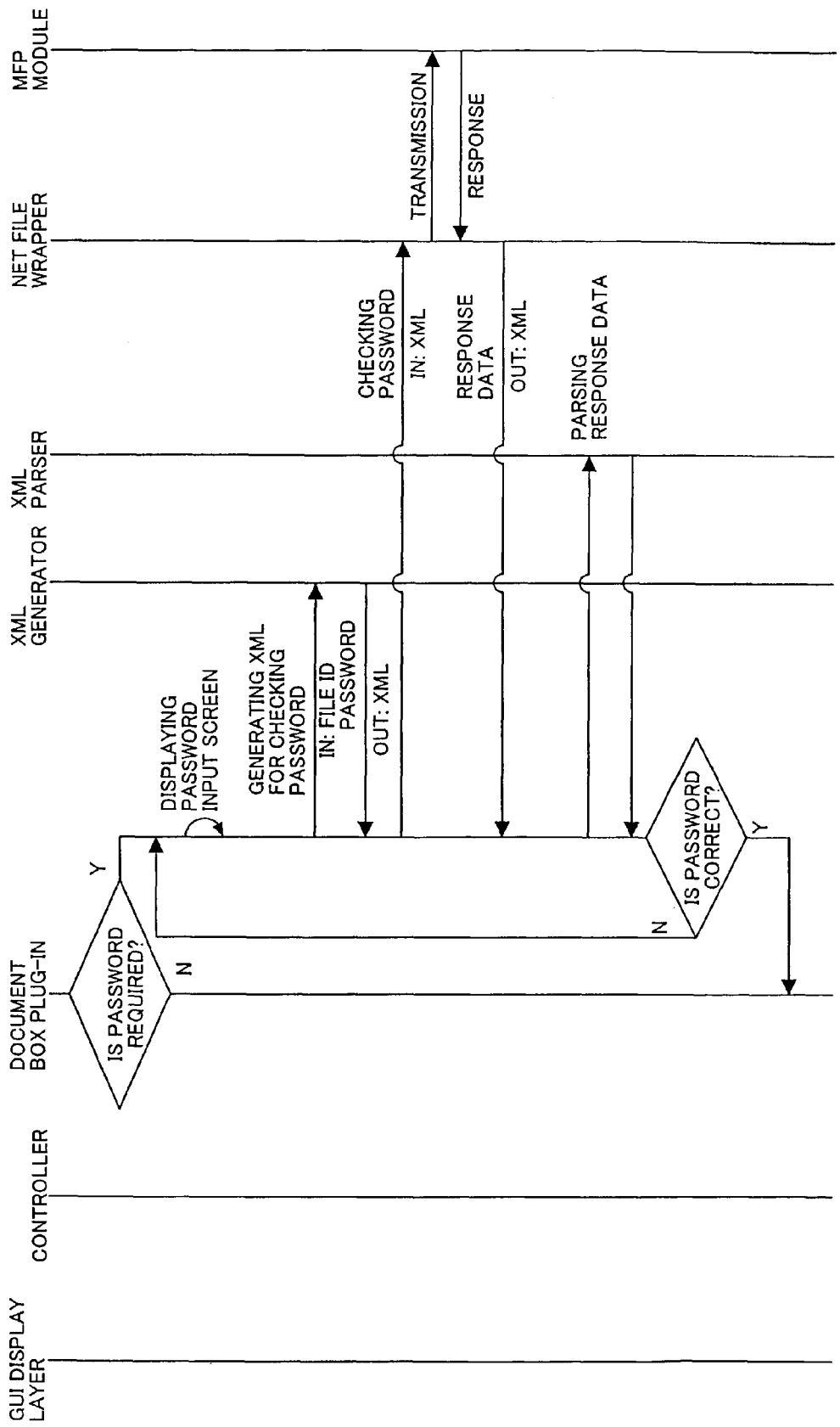
Figure 10C:
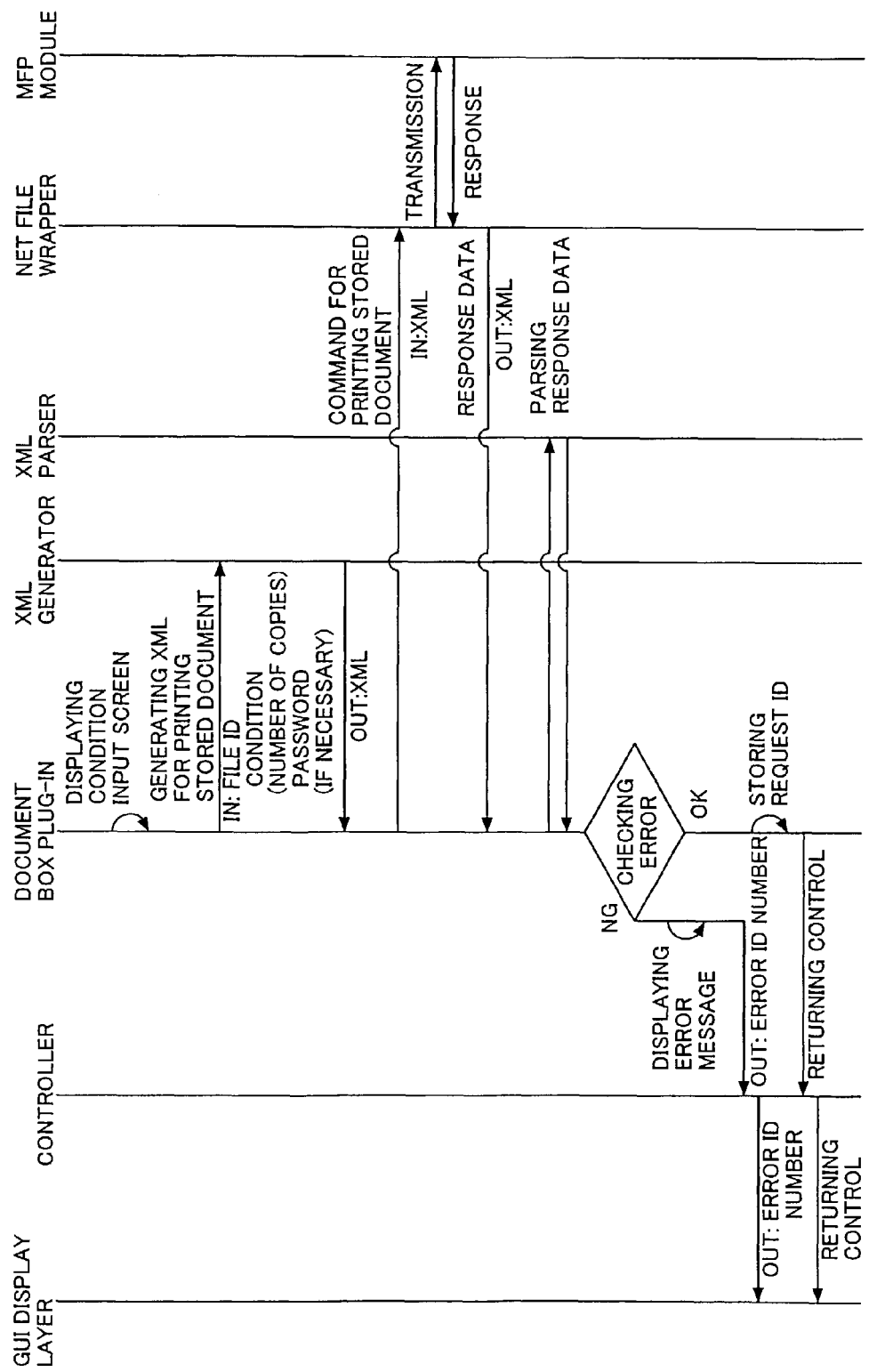
Figure 11:
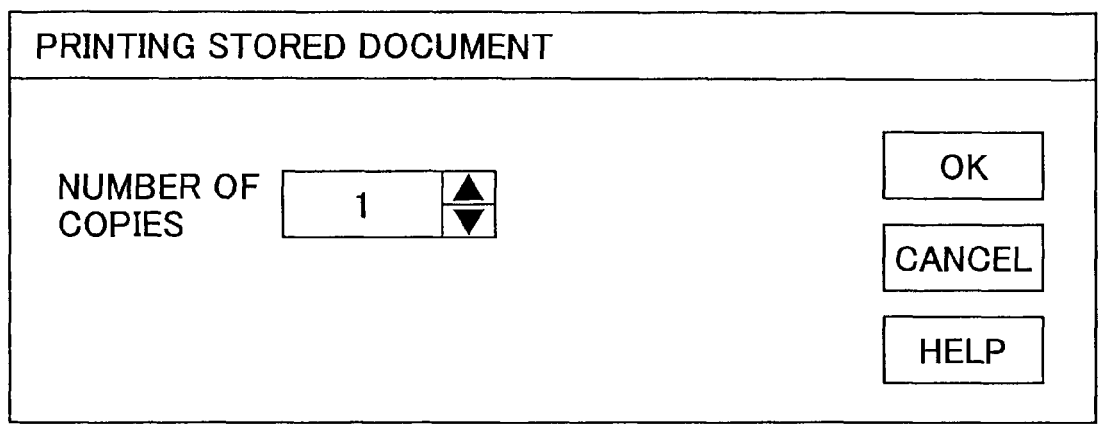
FIG. 11 illustrates a condition setting screen according to an embodiment.
Figure 12:
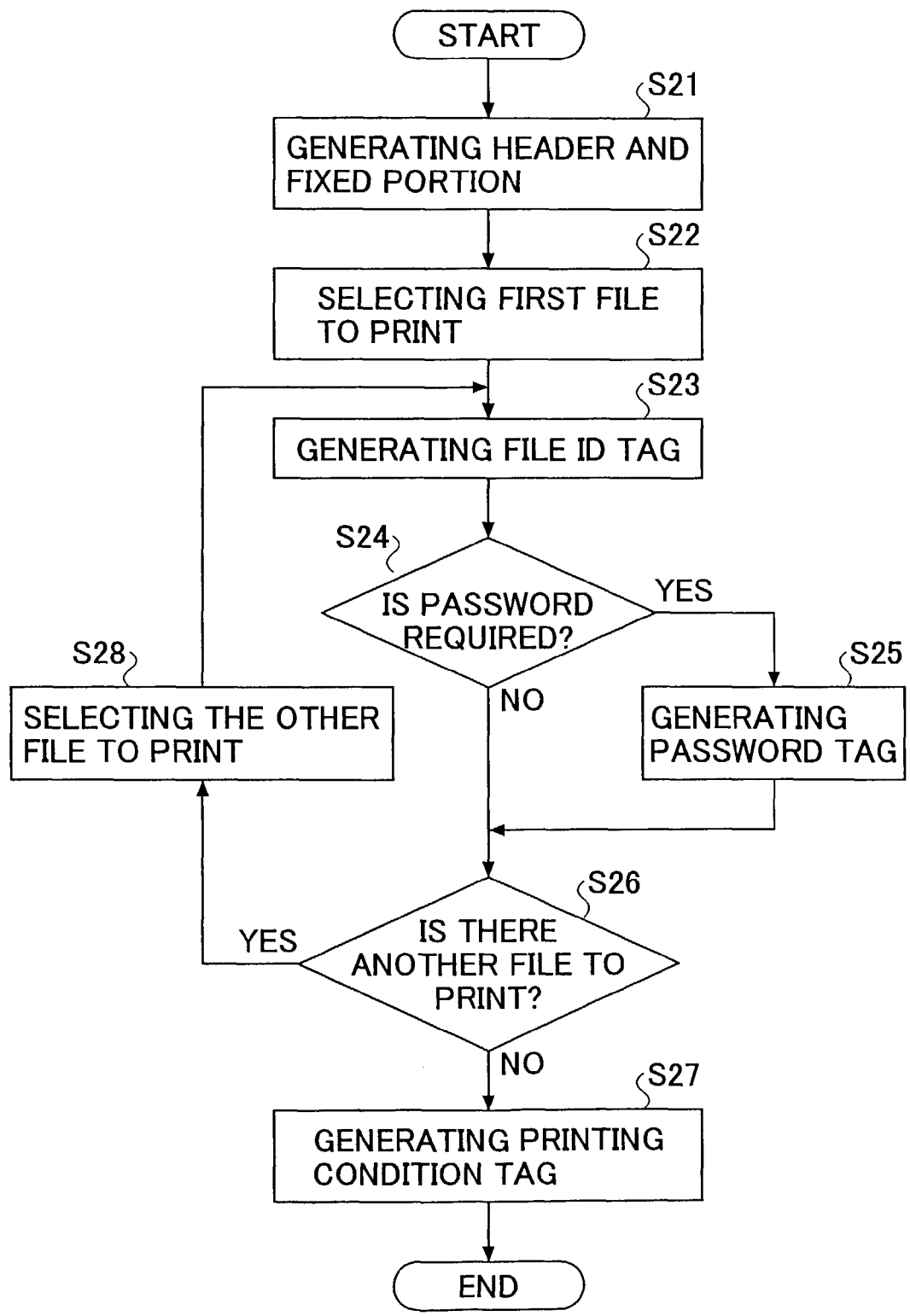
FIG. 12 is a flow chart showing the generating of a command according to an embodiment.

FIGS. 10A through 10C show a series of operation of programs in the case that PC 1 transmits the command for requesting MFP 2 to print a stored document. FIG. 11 is a schematic diagram of a screen that PC 1 displays to let the user set various conditions. FIG. 12 is a flow chart showing the generation of the command for requesting MFP 2 to print a stored document. FIG. 13 illustrates the command for requesting MFP 2 to print a stored document. FIG. 14 illustrates response data that MFP 2 returns to PC 1 in the case in which MFP 2 fails to process the command. FIG. 15 illustrates the response data that MFP 2 returns to PC 1 in the case in which MFP 2 successfully processes the command.

Data (documents) are converted into print-ready data that are directly printable, and stored in the data storage unit 24 of MFP 2. In response to a user's request, MFP 2 can print the print-ready data without any conversion. This operation is also referred to as "re-printing". When the stored document needs to be printed repeatedly, the re-printing function can accelerate the process because no data conversion from the document into the print-ready data is required.

In the data management system showed in FIGS. 1 and 2, the user can print a stored document stored in the data storage unit 24 of MFP 2 by operating PC 1. In this case, each program of the client module 100 performs processing showed in FIGS. 10A through 10C. In these figures, processing flows in the downward direction, and the arrows indicate that data are exchanged between the programs.

In response to the user's operation, the GUI presentation layer 101 transfers the instruction for the re-printing to the controller 102. The GUI presentation layer 101 also transfers simultaneously a plug-in ID for accessing an apparatus storing the document to be printed (MFP 2 in this case) and a document ID that identifies the document to be printed. In response to reception of this instruction, the controller 102 transfers this instruction and the related information such as the document ID to the plug-in designated by the plug-in ID (the document box plug-in 103 in this case).

The document box plug-in 103 converts the document ID that is the identification information of each document used at the PC 1 side into the file ID that is the identification information of each document used at the MFP 2 side, and transfers the file ID to the XML generator 106. The XML generator 16 generates an XML message (command) for determining whether a password is required for processing the document designated by the file ID. The command is transmitted to MFP 2 via the netfile wrapper 108.

At the MFP 2 side, in response to reception of the command for determining whether a password is required to access the document, the netfile 201 interprets the command of XML format, and determines whether the document is protected with a password by checking the stored data 206. The result is returned to PC 1 as response data of XML format.

The response data are received by the netfile wrapper 108 and transferred to the document box plug-in 103.

The document box plug-in 103, in response to reception of the response data, has the XML parser 107 parse (interpret) the response data. The document box plug-in 103 determines whether the command of XML format has been successfully processed by the netfile 201 by determining whether the response data indicate an error or not.

If the response data indicate that the command is not processed successfully, the document box plug-in 103 shows an error message on the display 18, and transfers the error number included in the response data interpreted by the XML parser 107 to the controller 102. The controller 102 returns the error number to the GUI presentation layer 101, and the operation of printing a stored document is over.

If the response data indicate that the command (XML message) is successfully processed, the operation showed in FIG. 10B will be executed. It is determined whether a password is required based on the interpreted response data. If the password is not required, the operation showed in FIG. 10C will be performed. If the password is required, the document box plug-in 103 displays a password input screen on the display 18, and requests the user to input the password.

Once the password is input, the document box plug-in transfers the input password and the file ID of the document to the XML generator 106, and causes the XML generator 106 to generate a command of XML format to determine whether the input password is correct or not. The generated command of XML format is transmitted to MFP 2 via the netfile wrapper 108.

At the MFP 2 side, in response to reception of the command for checking the password, the netfile 201 of MFP module 200 interprets the command, and determines whether the password is correct or not by checking the stored data 206. The result is transmitted to PC 1 as response data of XML format.

The response data are received by the netfile wrapper 108, and are returned to the document box plug-in 103.

The document box plug-in 103 has the XML parser 107 parses the contents of the response data, and determines whether the password input by the user is correct or not. If it is correct, the operation showed in FIG. 10C will be executed. But if it is not correct, or if MFP 2 did not successfully process the command for determining whether the password is correct, the document box plug-in 103 returns to the step of displaying the password input screen described above. If this process is repeated for a predetermined number of times, and the user fails to input the correct password, the document box plug-in 103 may return the error number to the controller 102 and the GUI presentation layer 101 and terminate the process.

If a password is not required, or the correct password is input, the document box plug-in 103 performs the operation showed in FIG. 10C and displays a screen (graphical user interface) on the display 18 as showed in FIG. 11 to let the user set printing conditions. FIG. 11 shows a screen that requires the user to input the number of copies. Besides the number of copies, the client module 100 may require the user to designate the size of paper, the orientation of paper, and whether stapling and punching holes are required. If a plurality of documents are to be printed, the process described above may be repeated for each copy.

If the user sets the printing condition and presses OK, the set printing condition, the file ID of the document to be printed, and the password, if necessary, are transferred to the XML generator 106. The XML generator 106 generates a command of XML format for requesting MFP 2 to print the stored document. The CPU 11 executing the XML generator 106 and the document box plug-in 103 corresponds to means for generating a command.

The generated command of XML format is transmitted to MFP 2 via the netfile wrapper 108. The CPU 11 executing the netfile wrapper 108 and the document box plug-in 103 corresponds to means for transmitting the generated command.

At the MFP 2 side, in response to reception of the command, the netfile 201 interprets the command, and gives instruction to the printer application 203 to perform the reprinting job. The netfile 201 returns the result to PC 1 as response data of XML format. At this point of time, the printing job has not been finished. The netfile 201 returns response data indicating only whether the command has been successfully processed. If the command has been successfully processed, the netfile 201 may include a request ID in the response data.

The netfile wrapper 108 receives the response data and transfers it to the document box plug-in 103. The CPU 11 executing the netfile wrapper 108 and the document box plug-in 103 corresponds to means for receiving response data.

In response to reception of response data, the document box plug-in 103 makes the XML parser 107 parse the response data. The CPU 11 executing the XML parser 107 and the document box plug-in 103 corresponds to means for interpreting the received response data.

The document box plug-in 103 determines by checking for error whether the response data indicate that the command has been successfully processed.

If the response data do not indicate that the command has been successfully processed, the document box plug-in 103 displays an error message on the display 18. The CPU 11 executing the document box plug-in 103 corresponds to means for displaying the interpreted response data.

The document box plug-in 103 returns the error number included in the response data parsed by the XML parser 107. In this case, the controller 102 also returns the error number to the GUI presentation layer 101. The operation of printing the stored document is over.

If the response data indicate that the command is processed normally, the document box plug-in stores the request ID included in the response data. The control is returned to the controller 102, and to the GUI presentation layer 101, and the operation of printing the stored document is over. Although not shown in the drawing, the document box plug-in 103 may display a message indicating that the command is normally processed on the display 18. The CPU 11 executing the document box plug-in 103 corresponds to means for displaying the interpreted response data.

As described above, PC 1 can request MFP 2 to print the stored document using the command of XML format.

The generating of the command for requesting to print a stored document is described below. FIG. 13 illustrates the command generated by this process. This command requests MFP 2 to print two copies each of the document of file ID "10" that is protected by a password and the document of file ID "20" that is not protected by a password.

When the command is ready to be generated, the document box plug-in 103 transfers needed information to the XML generator 106. The XML generator 106 executes the process showed in FIG. 12.

In step S21, the XML generator 106 generates the header portion and the fixed portion. The header portion indicates information such as the data format and the protocol to be used for transmission. The first three lines showed in FIG. 13 are the header portion. The tags <operation> and <reprint> in the fifth and sixth lines and the first and the second lines from the bottom indicate the fixed portion that is included in all commands of XML format for requesting to print the stored document.

In step S22, the first stored document to be printed is selected, and the <targetFile> tag corresponding to the selected stored document is generated.

In step S23, the file ID tag including the file ID of the stored document as an element is generated. In the example showed in FIG. 13, because the file ID of the first stored document to be printed is "10", the element of the file ID tag <fileID> is "10".

In step S24, it is determined whether a password is required to print the stored document. If a password is required, the document box plug-in goes to step S25. In step S25, a password tag having the password as an element is generated. If no password is required, step S25 is skipped. Since the first stored document requires a password, the password tag <password> having the password as an element is generated in FIG. 13.

In step S26, it is determined whether there remains another stored document to be printed. If no other stored document remains, the document box plug-in 103 goes to step S27 in which a printing condition tag that designates the printing condition is generated. If another stored document still remains, the document box plug-in returns to step S23 and repeats the following steps.

In the command showed in FIG. 13, because there remains another stored document to be printed, the <targetFile> tag and the <fileID> tag are generated. Because no password is set on this file, the <password> tag is not generated. A <copyVolume> tag that indicates the number of copies to be printed is generated.

Based on the above processing, the XML generator 106 generates the command of XML format for requesting MFP 2 to print the stored documents based on the file IDs of the stored documents to be printed, the password, and the printing condition.

The process in which the response data in response to the command are interpreted is described below.

In response to the command, MFP 2 returns response data of XML format shown in FIGS. 14 and 15. FIG. 14 illustrates response data in the case in which the command has not been processed normally (an error has occurred). FIG. 15 illustrates the case in which the command has been processed normally.

In response to reception of the response data, the document box plug-in 103 transfers the response data to the XML parser 107, and makes the XML parser 107 process the response data as described with reference to FIG. 9 in connection with the first example of operation. The flow chart of FIG. 9 shows the process that determines only whether the command is successfully processed or not and, if not successful, which type of error has occurred.

In step S11, the XML parser 107 search for a result tag. The tag <isSucceeded> of FIGS. 14 and 15 corresponds to the result tag in this case. This tag indicates whether the command has been successfully processed or not.

In step S12, it is determined whether the command has been successfully processed based on the result tag. If the command has not been successfully processed, step 13 is executed. In step S13, an error type tag is searched for. In step S14, the error type is obtained based on the error type tag.

The response data of FIG. 14 contains "fileNotFound" as the element of the <errorType> tag, and "10" as the element of the <fileID> tag indicating the file ID at which the error has occurred.

In step S15, the error type obtained in step S14 is converted into an error code that the document box plug-in 103 can understand. In step S16, the XML parser 107 returns the error code and the file ID to the document box plug-in 103. It is preferred that the controller 102 and the GUI presentation layer 101 can understand the error code.

If it is determined that the command has been successfully processed in step S12, in step S17, the XML parser 107 returns information indicating that the successful processing of the command to the document box plug-in 103.

Accordingly, the response data from MFP 2 is interpreted, and the client module 100 can know whether the command has been successfully processed or not, and if the command has not been processed successfully, the client module 100 (PC 1) can further know what kind of error occurred.

If necessary, it is possible to obtain more information than the error information by searching for appropriate tags. In the response data of FIG. 15, the tag <requested> in the eighth line indicates the requested ID as its element, and the <status> tag in the fifth line from the bottom indicates information of the state of MFP 2 at the point of the reception of the command. A detailed description of these tags is omitted.

As described above, in the data management system according to the present invention, the data management apparatus transmits commands written in structured document format (XML in this case) to the data storage apparatus. Accordingly, if the version of the client module 100 (mainly the plug-in portion) and the version of the MFP module 200 (mainly the net file-portion) are different, and information included in the command generated by the client module 100 and the information that MFP module 200 can understand (interpret) do not match, the MFP module 200 (the netfile 201) can process the command by using the information included in the command that the MFP module 200 can understand. As a result, MFP 2 can flexibly interpret and process the command transmitted by PC 1.

Since the response data transmitted from MFP 2 to PC 1 are also represented in XML format, if the response data include information that the XML parser 107 of PC 1 cannot interprets, the XML parser 107 can transfer only the information that the XML parser 107 can understand to the document box plug-in 103. Accordingly, the document box plug-in 103 can obtain information that the XML parser 107 can understand to further process the response data. As a result, even if only one of the client module 100 and the MFP module 200 is updated, the function available before the updating is guaranteed.

When the command or the response data represented in XML format are interpreted, the elements of understandable tags are used, and the elements of not understandable tags are simply disregarded. If the command or the response data of XML format do not include needed elements, the XML parser 107 or the netfile 201 disregards the absence of the needed elements.

Accordingly, the teachings of the present invention can improve the compatibility between the data storage apparatus and the data management apparatus, which makes the design and improvement of the data management system easy.

If the interpreted response data are displayed on the display 18, the user can determine whether the command has been successfully processed by MFP 2, and if an error occurs, what kind of error it is, by operating PC 1.

[Facsimile Transmission]

The case in which PC 1 transmits a command of XML format to have MFP 2 transmit a stored document via facsimile is described as the third example of operation of the data management system according to an embodiment of the present invention.

Figure 16A:
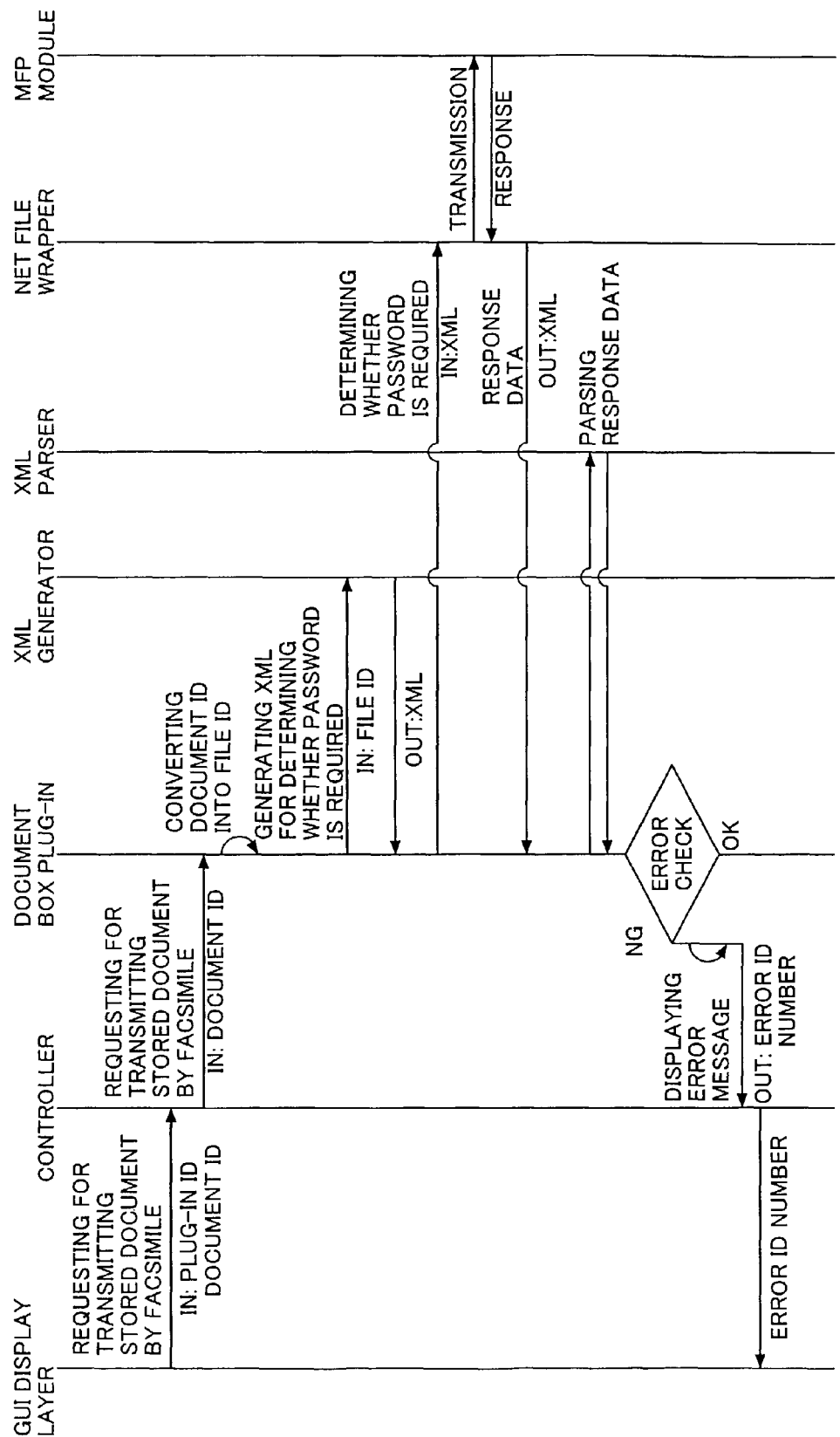
Figure 16C:
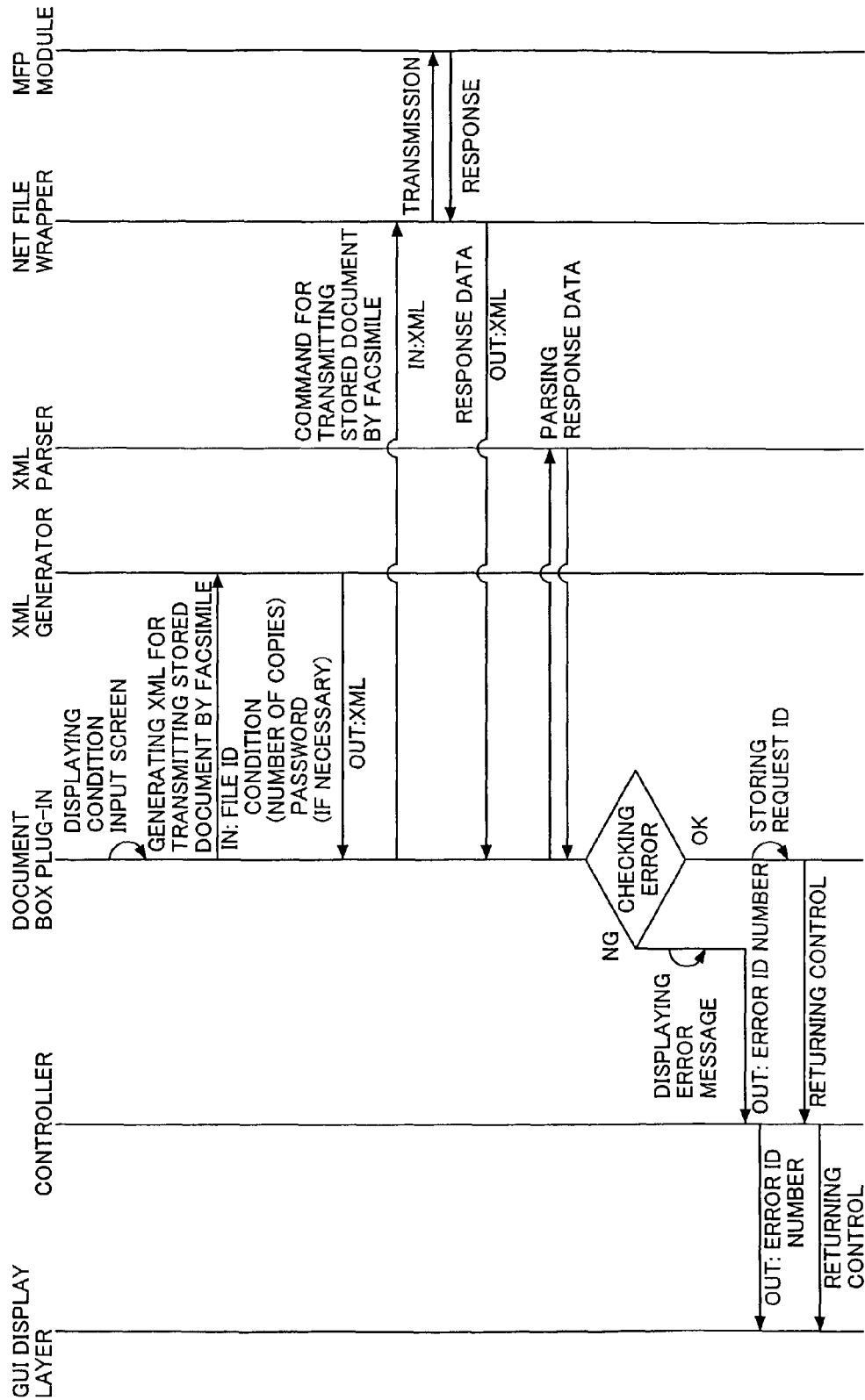
Figure 18:
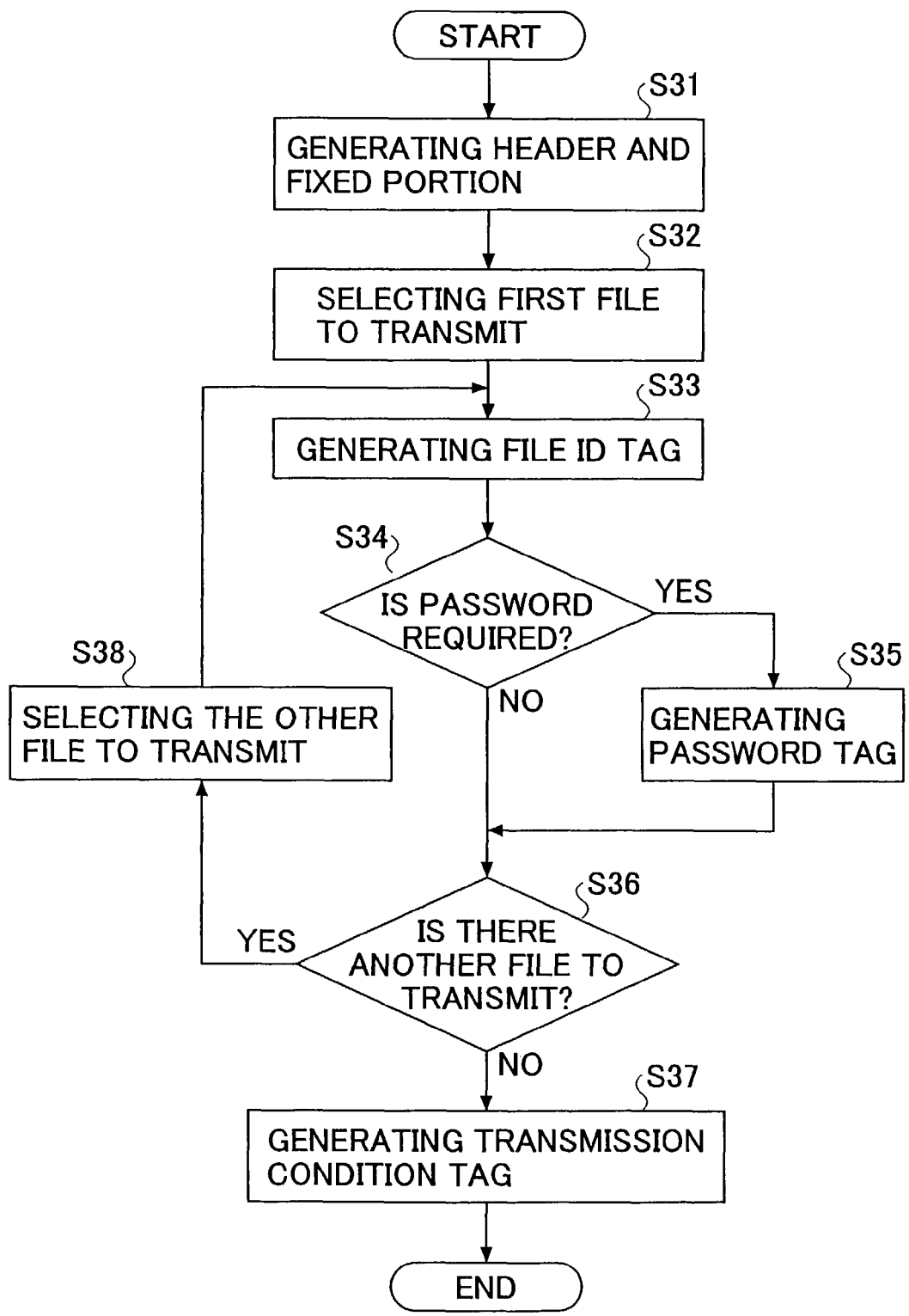
FIG. 18 is a flow chart showing the generating of a facsimile transmission command according to an embodiment.

FIGS. 16A through 16C show a series of operation of programs in the case that PC 1 transmits the command for requesting MFP 2 to transmit a stored document via facsimile. FIG. 17 is a schematic diagram of a screen that PC 1 displays to let the user set various conditions. FIG. 18 is a flow chart showing the generation of the command for requesting MFP 2 to transmit a stored document via facsimile. FIG. 19 illustrates the command for requesting MFP 2 to transmit a stored document via facsimile. FIG. 20 illustrates response data that MFP 2 returns to PC 1 in the case in which MFP 2 fails to process the command. FIG. 21 illustrates response data that MFP 2 returns to PC 1 in the case in which MFP 2 successfully processes the command.

Data (documents) are converted into encoded data that are directly transmittable via facsimile, and stored as the encoded data in the data storage unit 24 of MFP 2. In response to a user's request, MFP 2 can transmit the encoded data via facsimile without any data conversion. This operation is also referred to as "re-faxing". When the stored document needs to be transmitted via facsimile repeatedly, the re-faxing function can accelerate the process because no data conversion from the ordinary document into the encoded data is required.

In the data management system showed in FIGS. 1 and 2, the user can print a stored document stored in the data storage unit 24 of MFP 2 by operating PC 1. In this case, each program of the client module 100 performs processing showed in FIGS. 16A through 16C.

In response to the user's operation, the GUI presentation layer 101 transfers the instruction for the re-faxing to the controller 102. The GUI presentation layer 101 also transfers simultaneously a plug-in ID for accessing an apparatus storing the document to be transmitted via facsimile (MFP 2 in this case) and a document ID that identifies the document to be transmitted. In response to reception of this instruction, the controller 102 transfers this instruction and the related information such as the document ID to the plug-in designated by the plug-in ID (the document box plug-in 103 in this case).

The document box plug-in 103 converts the document ID that is the identification information of the document used at the PC 1 side into the file ID that is the identification information of the document used at the MFP 2 side, and transfers the file ID to the XML generator 106. The XML generator 16 generates an XML message (command) for determining whether a password is required for processing the document designated by the file ID.

The remaining portion of the process, in which the document box plug-in 103 determines whether a password is required to transmit a stored document and whether the password input by the user is correct is substantially identical to that of the above example described with reference to FIGS. 10A through 10C. Accordingly, the description is omitted.

If the password is not required, or the correct password is input, the document box plug-in 103 performs the operation showed in FIG. 16C and displays a screen (graphical user interface) on the display 18 as showed in FIG. 17 to let the user set transmission conditions. FIG. 17 shows a screen that requires the user to input the destination of the facsimile transmission. Besides the destination of transmission, the client module 100 may require the user to designate a personal transmission or the addition of a cover sheet. If a plurality of documents are to be transmitted, the process described above may be repeated for each copy as does the process in the second example of operation above.

If the user sets the transmission condition and presses OK, the set transmission condition, the file ID of the document to be transmitted, and the password, if necessary, are transferred to the XML generator 106. The XML generator 106 generates a command of XML format for requesting MFP 2 to transmit the stored document via facsimile. The CPU 11 executing the XML generator 106 and the document box plug-in 103 corresponds to means for generating a command.

The generated command of XML format is transmitted to MFP 2 via the netfile wrapper 108. The CPU 11 executing the netfile wrapper 108 and the document box plug-in 103 corresponds to means for transmitting the generated command.

At the MFP 2 side, in response to reception of the command, the netfile 201 interprets the command, and gives instruction to the facsimile application 204 to perform the re-faxing job. The netfile 201 returns the result to PC 1 as response data of XML format. At this point of time, transmission job has not been finished. The netfile 201 returns response data indicating only whether the command has been successfully processed. If the command has been successfully processed, the netfile 201 may include a request ID in the response data.

The netfile wrapper 108 receives the response data and transfers it to the document box plug-in 103.

Since the remaining portion of the process is substantially identical to that of the second example of operation described with reference to FIG. 10C above, no description is given.

PC 1 can request MFP 2 to transmit the stored document via facsimile as described above.

The generating of the command for requesting to transmit a stored document via facsimile is described below. FIG. 19 illustrates the command generated by this process. This command requests MFP 2 to transmit the document of file ID "10" that is protected by a password and the document of file ID "20" that is not protected by a password via facsimile to a facsimile number "03-xxxx-yyyy".

When the command is ready to be generated, the document box plug-in 103 transfers needed information to the XML generator 106. The XML generator 106 executes the process showed in FIG. 18.

In step S31, the XML generator 106 generates the header portion and the fixed portion. The header portion indicates information such as the data format and the protocol to be used for transmission. The first three lines showed in FIG. 19 are the header portion. The tags <operation> and <sendFax> in the fifth and sixth lines and the first and the second lines from the bottom indicates the fixed portion that is include in all commands of XML format for requesting to transmit the stored document via facsimile.

In step S32, the first stored document to be printed is selected, and the <targetFile> tag corresponding to the selected stored document is generated. Because steps S33 through S35 are substantially identical to steps S23 through S25 of the second example of operation described with reference to FIG. 12 above, their description is omitted.

In step S36, it is determined whether there remains another stored document to be transmitted. If no other stored document remains, the document box plug-in 103 goes to step S37 in which a transmission condition tag that designates the transmission condition is generated. If another stored document still remains, the document box plug-in goes to step S38, then returns to step S33 and repeats the following steps.

In the command showed in FIG. 19, the <targetFile> tag and the <fileID> tag are generated for the file of file ID "20", and the <receiver> tag indicating the destination of transmission and the <receiverID> tag of which element is the FAX number of the destination are further generated.

Based on the above processing, the XML generator 106 generates the command of XML format for requesting MFP 2 to transmit the stored documents via facsimile based on the file IDs of the stored documents to be transmitted, the password, and the transmission condition.

In response to the command showed in FIG. 19, MFP 2 returns the response data of XML format shown in FIGS. 20 and 21. FIG. 20 illustrates response data in the case in which the command has not been processed normally (an error has occurred). FIG. 21 illustrates the case in which the command has been processed normally.

In response to reception of the response data, the document box plug-in 103 interprets the response data using the XML parser 107 as described with reference to FIG. 9 in connection with the first and second examples of operation. The document box plug-in 103 can determine whether the command has been successfully processed and what kind of error, if any, has occurred.

Comparing the response data showed in FIG. 20 with those of FIG. 14, one may notice that the response data showed in FIG. 20 can be interpreted in the substantially same manner in which the response data showed in FIG. 14 is interpreted because the result of processing of the command and the error type are indicated as elements of <isSucceeded> tag and the <errorType> tag.

As described above, the generating process of the facsimile transmission command showed in FIG. 18 has the same steps as the process of generating the print command showed in FIG. 12. Only step S31 in which the fixed portion is generated and step S37 in which the transmission condition tag is generated are different from those of FIG. 12.

Accordingly, if a program that generates the command for printing the stored document and a program that interprets response data to the command are already developed, it is easy to further develop programs for generating a command for facsimile transmission and interpreting response data to the command since the major portion of the programs are common. The reason is that, because the command and the response data are represented by the structured document format, the data structure of the command and response data is easily changed by adding, deleting, or changing the tags.

Accordingly, the teachings of the present invention can improve the compatibility between the data storage apparatus and the data management apparatus, which makes the design and improvement of the data management system easy.

[Distributing Scanned Documents]

The case in which PC 1 transmits a command of XML format to have MFP 2 transmit a scanned document via the network to a distribution server is described below as the fourth example of operation of the data management system according to an embodiment of the present invention.

The server module 400 showed in FIG. 1 is a program run by the distribution server 4. The server module 400 includes a GUI presentation layer 401, a controller 402, a network interface 403, and a tray management unit 404.

The GUI presentation layer 401 displays a graphical user interface on a display (not shown), and receives the user's instruction. The user can manage the distribution server 4 through the GUI presentation layer 401. A controller 402 is a program that mediates and exchanges data between the other programs and the GUI presentation layer 401. A tray management unit 404 is further provided with a plurality of trays 410, 411, . . . . The user can categorize his/her data and store data in a tray corresponding to the category of the data.

Figure 22A:
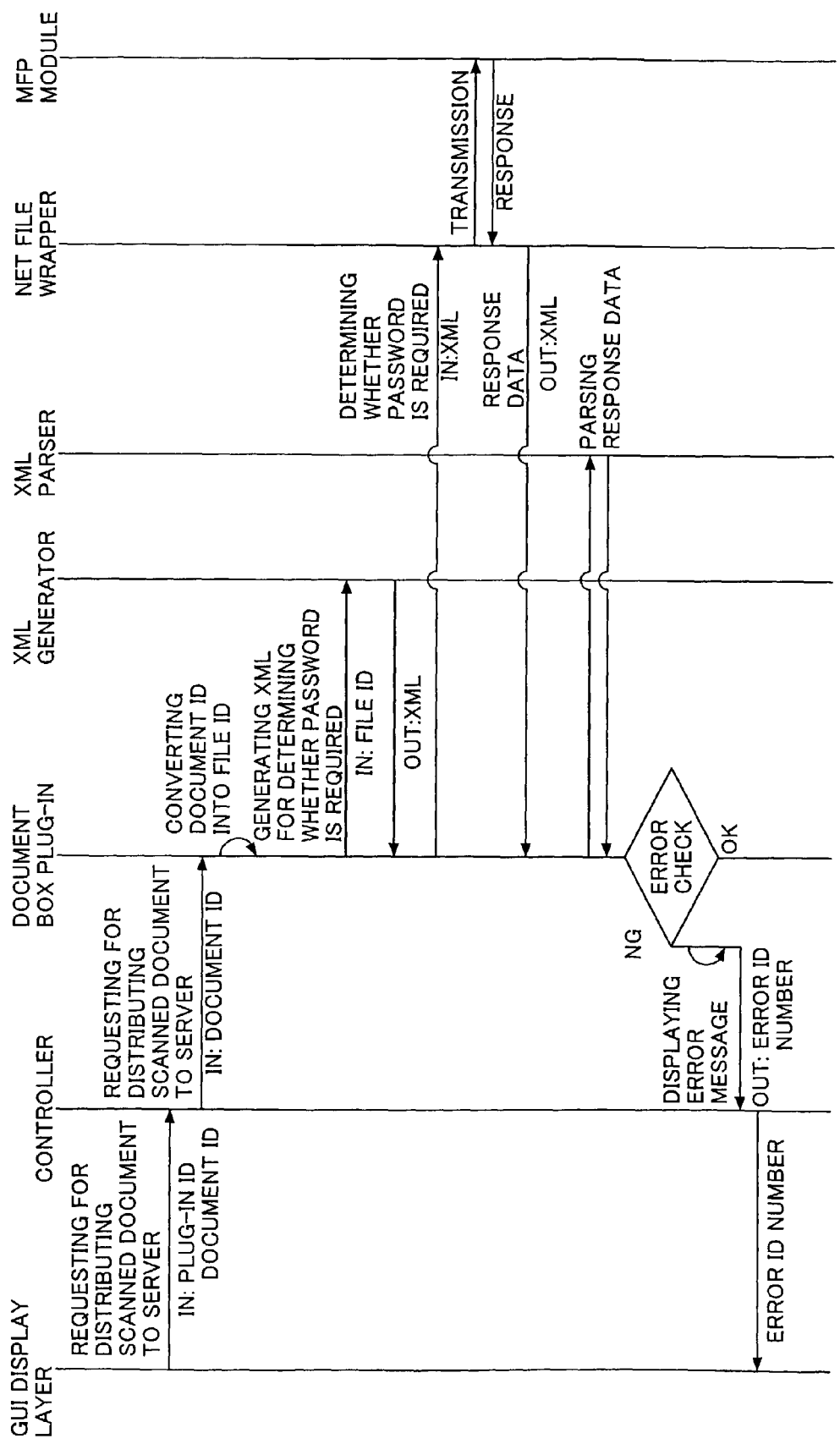
FIGS. 22A, 22B, and 22C are a continuous series of schematic diagrams showing the operation of computer programs according to an embodiment in the case in which a PC requests an MFP to distribute a scanned document to a distribution server via a network.
Figure 22B:
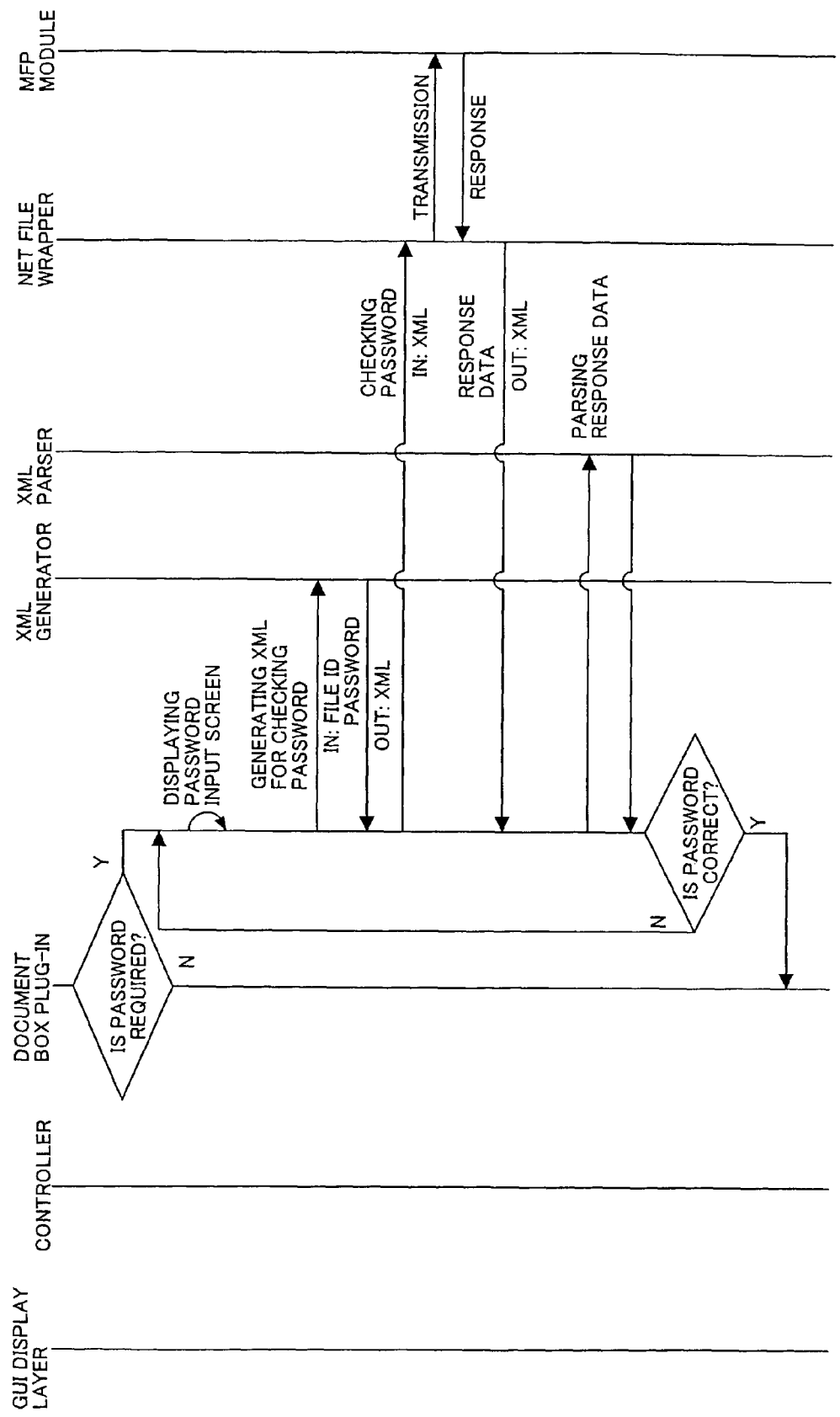
Figure 22C:
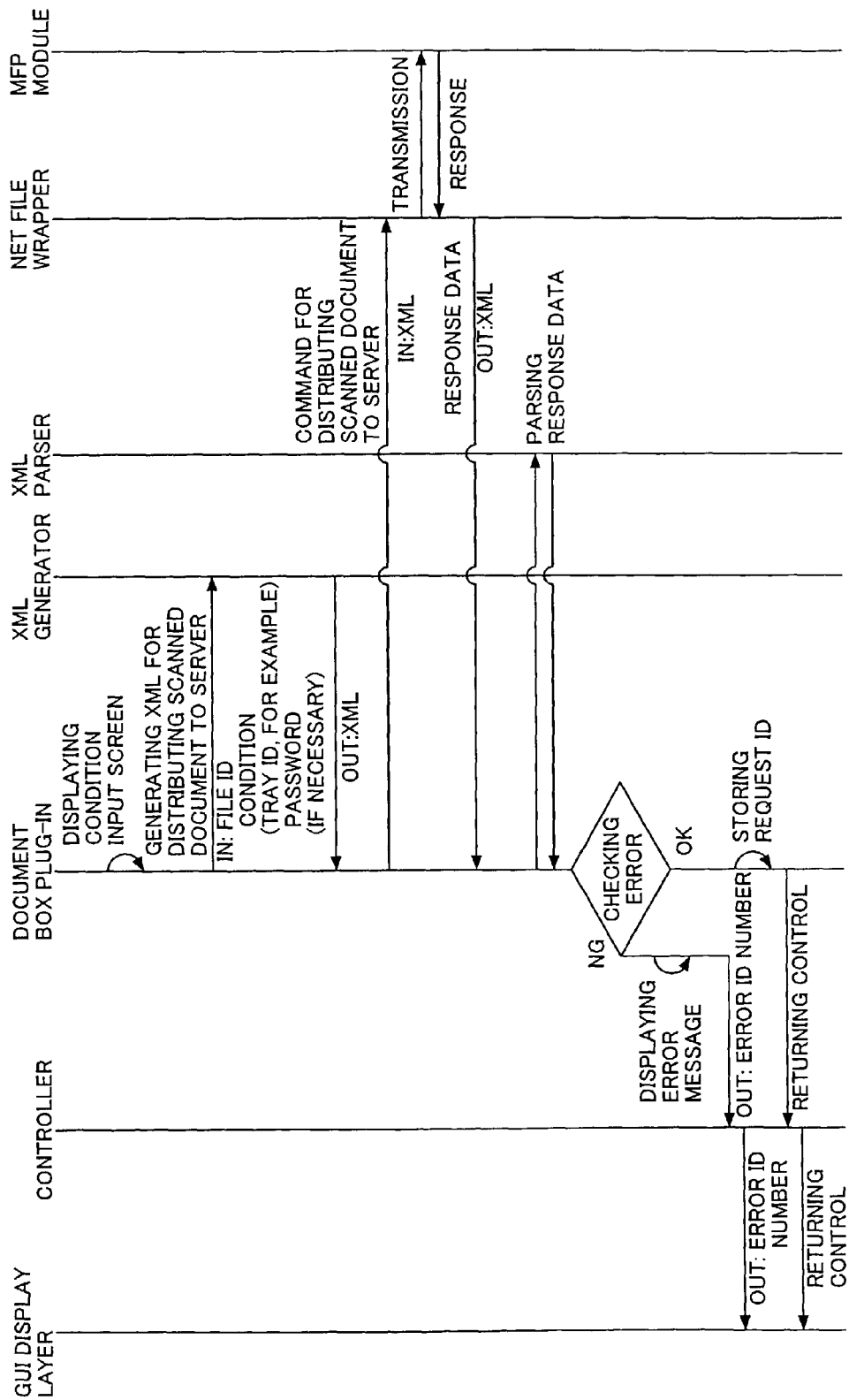
Figure 24:
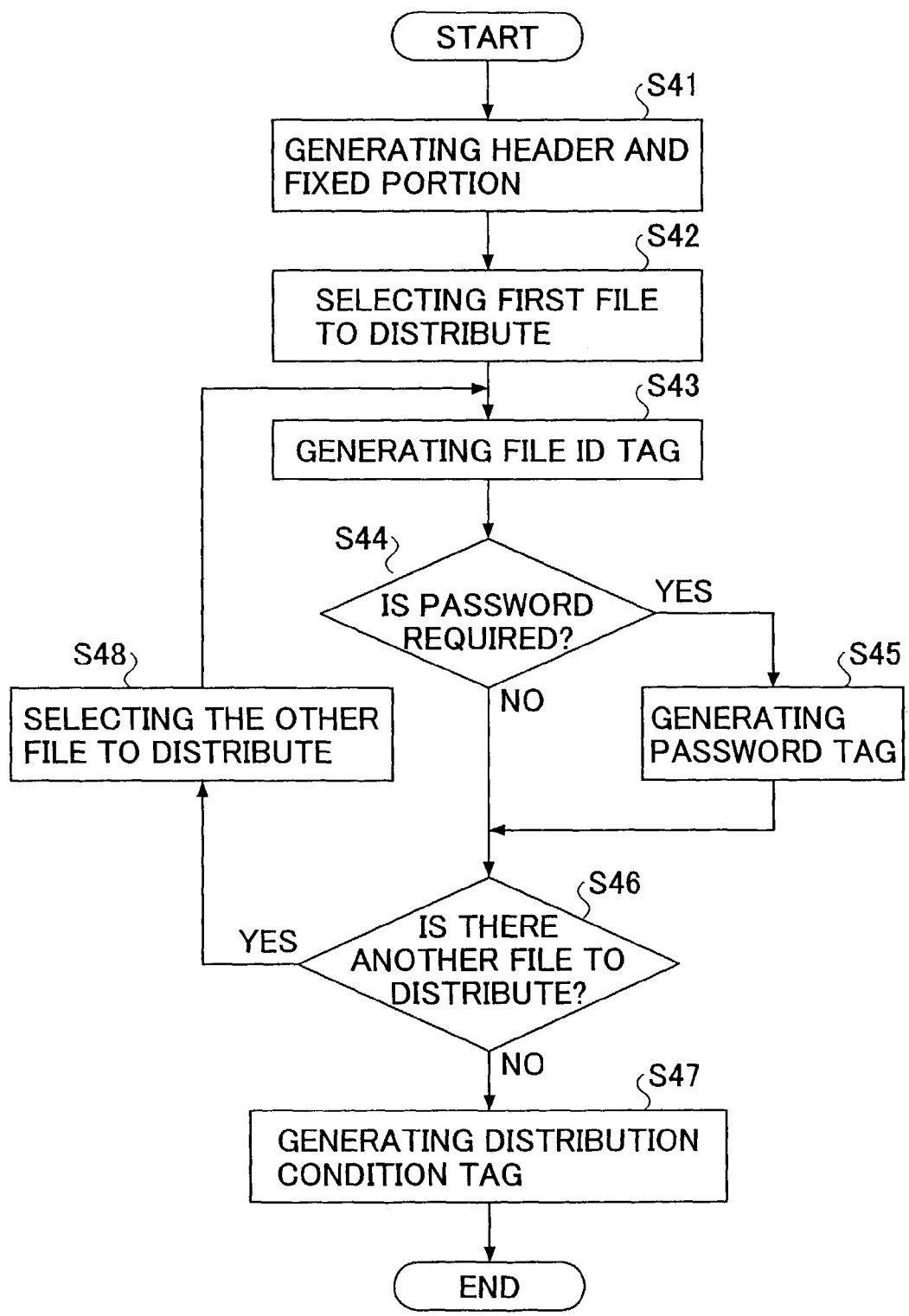
FIG. 24 is a flow chart showing the generating of a scanner distribution command according to an embodiment.

FIGS. 22A through 22C show a series of operation of programs in the case PC 1 transmits the command for requesting MFP 2 to distribute a scanned document to the distribution server 4. FIG. 23 is a schematic diagram of a screen that PC 1 displays to let the user set various conditions. FIG. 24 is a flow chart showing the generation of the command for requesting MFP 2 to distribute a scanned document to the distribution server 4. FIG. 25 illustrates the command for requesting MFP 2 to distribute a scanned document to the distribution server 4. FIG. 26 illustrates response data that MFP 2 returns to PC 1 in the case in which MFP 2 fails to process the command. FIG. 27 illustrates response data that MFP 2 returns to PC 1 in the case in which MFP 2 successfully processes the command.

The user can scan documents and store the scanner data (scanned documents) in the stored data 206 of MFP 2 in advance. The user can distribute the scanned documents stored in MFP 2 to the virtual trays provided in the distribution server 4 via the network 3. This operation is also referred to as "scanner re-distribution".

In the data management system showed in FIGS. 1 and 2, the user can distribute a scanned document stored in the data storage unit 24 of MFP 2 by operating PC 1. In this case, each program of the client module 100 performs processing showed in FIGS. 22A through 22C.

In response to the user's operation, the GUI presentation layer 101 transfers the instruction for the scanner re-distribution to the controller 102. The GUI presentation layer 101 also transfers simultaneously a plug-in ID for accessing an apparatus storing the document to be transmitted via facsimile (MFP 2 in this case) and a document ID that identifies the document to be distributed. In response to reception of this instruction, the controller 102 transfers this instruction and the related information such as the document ID to the plug-in designated by the plug-in ID (the document box plug-in 103 in this case).

The document box plug-in 103 converts the document ID that is the identification information of the document used at the PC 1 side into the file ID that is the identification information of the document used at the MFP 2 side, and transfers the file ID to the XML generator 106. The XML generator 106 generates an XML message (command) for determining whether a password is required for processing the document designated by the file ID.

The remaining portion of the process, in which the document box plug-in 103 determines whether a password is required to distribute a scanned document and whether the password input by the user is correct, is substantially identical to that of the above example described with reference to FIGS. 10A through 10C. Accordingly, the description is omitted.

If the password is not required, or the correct password is input, the document box plug-in 103 performs the operation showed in FIG. 22C and displays a screen (graphical user interface) on the display 18 as showed in FIG. 23 to let the user set distribution conditions. FIG. 23 shows a screen that requires the user to input the destination of distribution. Besides the destination of distribution, the client module 100 may require the user to designate the addition of a cover sheet, for example. If a plurality of documents are to be distributed, the process described above may be repeated for each copy as done in the second example of operation.

If the user sets the distribution condition and presses TRANSMISSION, the set distribution condition, the file ID of the document to be distributed, and the password, if necessary, are transferred to the XML generator 106. The XML generator 106 generates a command of XML format for requesting MFP 2 to distribute the scanned document via the network. The CPU 11 executing the XML generator 106 and the document box plug-in 103 corresponds to the means for generating a command.

The generated command of XML format is transmitted to MFP 2 via the netfile wrapper 108. The CPU 11 executing the netfile wrapper 108 and the document box plug-in 103 corresponds to means for transmitting the generated command.

At the MFP 2 side, in response to reception of the command, the netfile 201 interprets the command, and gives instruction to the scanner application 205 to perform the scanner re-distribution job.

The scanner application 205, in response to reception of the above instruction, obtains the scanned document designated by the file ID from the scanned documents stored in the stored data 206, and transfers the scanned document to the netfile together with the information of the destination of distribution. The netfile 201, in response to reception of the designated scanned document and the information of the distribution destination, distributes the scanned document to the distribution destination.

At the distribution server 4 side, the network service 403 receives the scanned document and the information indicating the tray in which the scanned document is to be stored. The received scanned document is transferred to the tray management unit 404 via the controller 402, and is stored in the tray that the user has designated. Besides the user who distributes the scanned document to the distribution server 4, any other users who are authorized to access the scanned document distributed to the distribution server 4 can access the scanned document by inputting a password, for example.

On the other hand, the netfile 201 returns the result of the scanner re-distribution to PC 1 as response data of XML format. The netfile 201 returns response data indicating only whether the command has been successfully processed. If the command has been successfully processed, the netfile 201 may include a request ID in the response data.

The netfile wrapper 108 receives the response data and transfers them to the document box plug-in 103.

Since the remaining portion of the process is substantially identical to that of the second example of operation described with reference to FIG. 10C above, no description is given.

PC 1 can request MFP 2 to distribute the scanned document to the distribution server 4 via the network as described above.

The generating of the command for requesting to distribute a scanned document to the distribution server via the network is described below. FIG. 25 illustrates the command generated by this process. This command requests MFP 2 to distribute the scanned document of file ID "10" that is protected by a password and the scanned document of file ID "20" that is not protected by a password via facsimile to a tray ID "xxxx" of the distribution server 4.

When the command is ready to be generated, the document box plug-in 103 transfers needed information to the XML generator 106. The XML generator 106 executes the process showed in FIG. 24.

In step S41, the XML generator 106 generates the header portion and the fixed portion. The header portion indicates information such as the data format and the protocol to be used for transmission of the command. The first three lines showed in FIG. 25 are the header portion. The tags <operation> and <distScan> in the fifth and sixth lines and the first and the second lines from the bottom indicate the fixed portion that is included in all commands of XML format for requesting to distribute the scanned document to the distribution server 4 via the network.

In step S42, the first scanned document to be distributed is selected, and the <targetFile> tag corresponding to the selected scanned document is generated. Because steps S43 through S45 are substantially identical to steps S23 through S25 of the second example of operation described with reference to FIG. 12 above, their description is omitted.

In step S46, it is determined whether there remains another scanned document to be distributed to the distribution server 4. If no other stored document remains, the document box plug-in 103 goes to step S47 in which a distribution condition tag that designates the distribution condition is generated. If another scanned document still remains, the document box plug-in goes to step S48, then returns to step S43 and repeats the following steps.

In the command showed in FIG. 25, the <targetFile> tag and the <fileID> tag are generated for the file of file ID "20", and the <tray> tag indicating the destination of distribution and the <trayID> tag of which element is the tray ID number are further generated.

Based on the above processing, the XML generator 106 generates the command of XML format for requesting MFP 2 to distribute the scanned documents to the distribution server 4 via the network based on the file IDs of the scanned documents to be distributed, the password, and the distribution condition.

In response to the command showed in FIG. 25, MFP 2 returns response data of XML format shown in FIGS. 26 and 27. FIG. 26 illustrates response data in the case in which the command has not been processed normally (an error has occurred). FIG. 27 illustrates the case in which the command has been processed normally.

In response to reception of the response data, the document box plug-in 103 interprets the response data using the XML parser 107 as described with reference to FIG. 9 in connection with the first and second examples of operation. The document box plug-in 103 can determine whether the command has been successfully processed and what kind of error, if any, has occurred.

Comparing the response data showed in FIG. 26 with those of FIG. 14, one may notice that the response data showed in FIG. 26 can be interpreted in the substantially same manner in which the response data showed in FIG. 14 are interpreted because the result of processing of the command and the error type are indicated as elements of <isSucceeded> tag and the <errorType> tag.

As described above, the generating process of the scanner re-distribution command showed in FIG. 25 has the same steps as the process of generating the re-printing command showed in FIG. 12. Only step S41 in which the fixed portion is generated and step S47 in which the distribution condition tag is generated are different from those of FIG. 12.

Accordingly, if a program that generates the command for printing the stored document and a program that interprets response data to the command are already developed, it is easy to further develop programs for generating a command for scanner re-distribution and interpreting response data to the command since the major portion of the programs are common. The reason is that, because the command and the response data are represented by the structured document format, the data structure of the command and response data is easily changed by adding, deleting, or changing the tags.

Accordingly, the teachings of the present invention can improve the compatibility between the data storage apparatus and the data management apparatus, which makes the design and improvement of the data management system easy.

In the above description, the data storage apparatus, MFP 2, is assumed to function as a copier, a printer, a facsimile machine, and a scanner. However, if one desires to realize the re-printing function, only the printer function is required. Likewise, if one desires to realize the facsimile transmission function, for example, only the facsimile function of MFP 2 is required.

The data storage apparatus according to the present invention is not limited to MFP 2, but may be a set of apparatuses having a data storage unit coupled with an image forming unit, a facsimile communication unit, and a scanner distribution unit separately.

The present invention is not limited to the above operation, that is, the operation of obtaining a document list, the operation of re-printing a stored document, the operation of facsimile transmission, and the operation of scanner re-distribution. The present invention is also applicable to commands and response data other than the above operation. One of many features of the present invention is that one can design and improve a command set easily and can make the command set usable for general purposes. Thanks to the present invention, one can add new functions to an apparatus and a program so as to make the apparatus and the program more convenient.

In the above embodiment, the data management system is provided with a data management apparatus, a data storage apparatus, and a distribution server. However, it is possible to construct the data management system with a plurality of data management apparatuses, a plurality of data storage apparatuses, and a plurality of distribution servers. In this case, any data management apparatus can transmit commands to any data storage apparatus.

The computer programs that cause the CPU 11 of PC 1 to operate as each of the means as described above can be stored in HDD 14 of PC 1. The computer programs may be stored in recording media such as a CD-ROM, a flexible disk, SRAM, EEPROM, and a memory card. One can have the CPU 11 operate by installing the computer programs stored in the recording medium into PC 1, or having the CPU 11 read and run the computer programs stored in the recording medium.

It is also possible to download the computer programs via the network from an external server storing the computer programs, for example.

The preferred embodiments of the present invention are described above. The present invention is not limited to these embodiments, but various variations and modifications may be made without departing from the scope of the present invention.

This patent application is based on Japanese Laid-open Patent Application No. 2002-149121 filed on May 23, 2002, and No. 2003-143548 filed on May 21, 2003, the entire contents of which are hereby incorporated by reference.

What is claimed is:

1. A data management apparatus connected to a data storage apparatus via a network, comprising:
    a graphical user interface configured to receive a user command comprising a request for said data storage apparatus to transmit a list of documents stored therein and one or more conditions for the list of documents;
    means for converting the user command received by the graphical user interface to a command of structured document format for said data storage apparatus, the command of said structured document format being understandable by said data storage apparatus;
    means for transmitting the generated command to said data storage apparatus;
    means for receiving response data of said structured document format transmitted by said data storage apparatus in response to reception of the transmitted command; and
    means for interpreting the received response data into a format understandable by a particular application program installed in the data management apparatus,
    wherein said command comprises a request for said data storage apparatus to determine whether authorization information is required to process a document stored in said data storage apparatus,
    said command comprises a request for said data storage apparatus to determine whether input authorization information matches authorization information of a document stored in said data storage apparatus,
    when the command has not been successfully processed, the response data includes error information indicating a type of error occurred, and the means for interpreting the received response data converts the error information into a format understandable by the particular application program installed in the data management apparatus, and wherein said means for transmitting the generated command transmits the generated command as a SOAP message; and said means for receiving response data receives said response data as a SOAP message.

2. The data management apparatus as claimed in claim 1, further comprising means for displaying the interpreted response data on a display unit.

3. The data management apparatus as claimed in claim 1, wherein said data storage apparatus includes a facsimile transmission unit, and said command comprises a request for said facsimile transmission unit to transmit a document stored in said data storage apparatus.

4. The data management apparatus as claimed in claim 1, wherein said data storage apparatus includes a scanner distribution unit, and said command comprises a request for said scanner distribution unit to distribute a document stored in said data storage apparatus.

5. The data management apparatus as claimed in claim 1, wherein said structured document format is extensible markup language format.

6. A data management apparatus connected to a data storage apparatus via a network, comprising:
    a graphical user interface configured to receive a user command comprising a request for said data storage apparatus to transmit a list of documents stored therein and one or more conditions for the list of documents;
    a network interface unit; and
    a controller configured to convert the user command received by the graphical user interface to a command of structured document format for said data storage apparatus, the command of said structured document format being understandable by said data storage apparatus, transmit the generated command to said data storage apparatus through said network interface unit and said network, receive, through said network and said network interface unit, response data of said structured document format transmitted by said data storage apparatus in response to reception of the transmitted command, and interpret the received response data into a format understandable by a particular application program installed in the data management apparatus,
    wherein said command comprises a request for said data storage apparatus to determine whether authorization information is required to process a document stored in said data storage apparatus,
    said command comprises a request for said data storage apparatus to determine whether input authorization information matches authorization information of a document stored in said data storage apparatus,
    when the command has not been successfully processed, the response data includes error information indicating a type of error occurred, and the controller is configured to convert the error information into a format understandable by the particular application program installed in the data management apparatus, and wherein the controller transmits the generated command as a SOAP message, and receives the response data written as a SOAP message from said data storage apparatus.

7. A computer program stored in a computer readable medium which causes a computer connected to a data storage apparatus via a network to function as:
    a graphical user interface configured to receive a user command comprising a request for said data storage apparatus to transmit a list of documents stored therein and one or more conditions for the list of documents;
    means for converting the user command received by the graphical user interface to a command of structured document format for said data storage apparatus, the command of said structured document format being understandable by said data storage apparatus;

means for transmitting the generated command to said data storage apparatus;

means for receiving response data of said structured document format transmitted by said data storage apparatus in response to reception of the transmitted command; and means for interpreting the received response data into a format understandable by a particular application program installed in the data management apparatus, wherein said command comprises a request for said data storage apparatus to determine whether authorization information is required to process a document stored in said data storage apparatus, said command comprises a request for said data storage apparatus to determine whether input authorization information matches authorization information of a document stored in said data storage apparatus, when the command has not been successfully processed, the response data includes error information indicating a type of error occurred, and the means for interpreting the received response data converts the error information into a format understandable by the particular application program installed in the data management apparatus and wherein said means for transmitting the generated command transmits the generated command as a SOAP message; and said means for receiving response data receives said response data as a SOAP message.

8. The computer program as claimed in claim 7, that further causes said computer to function as means for displaying the interpreted response data on a display unit.

9. The computer program as claimed in claim 7, wherein said data storage apparatus includes a facsimile transmission unit, and said command comprises a request for said facsimile transmission unit to transmit a document stored in said data storage apparatus.

10. The computer program as claimed in claim 7, wherein said data storage apparatus includes a scanner distribution unit, and said command comprises a request for said scanner distribution unit to distribute a document stored in said data storage apparatus.

11. The computer program as claimed in claim 7, wherein said structured document format is extensible markup language format.

12. A method of managing a data storage apparatus, comprising the steps of:

receiving, at a graphical user interface, a user command comprising a request for said data storage apparatus to transmit a list of documents stored therein and one or more conditions for the list of documents;

converting the user command received by the graphical user interface to a command of structured document format for said data storage apparatus, the command of said structured document format being understandable by said data storage apparatus;

transmitting the generated command to said data storage apparatus;

receiving response data of said structured document format transmitted by said data storage apparatus in response to reception of the transmitted command; and interpreting the received response data into a format understandable by a particular application program installed in the data management apparatus, wherein said command comprises a request for said data storage apparatus to determine whether authorization information is required to process a document stored in said data storage apparatus, said command comprises a request for said data storage apparatus to determine whether input authorization information matches authorization information of a document stored in said data storage apparatus, when the command has not been successfully processed, the response data includes error information indicating a type of error occurred, and the interpreting includes converting the error information into a format understandable by the particular application program installed in the data management apparatus, and wherein transmitting the generated command transmits the generated command as a SOAP message; and receiving response data receives said response data as a SOAP message.

13. A data management apparatus connected to a data storage apparatus via a network, comprising:

a graphical user interface configured to receive a user command comprising a request for said data storage apparatus to transmit a list of documents stored therein and one or more conditions for the list of documents;

means for converting the user command received by the graphical user interface to a command of structured document format for said data storage apparatus, the command of said structured document format being understandable by said data storage apparatus; and means for parsing data in the structured document format received from the data storage apparatus, and for translating the data into a format to be processed by another program installed in the data management apparatus, wherein the command comprises a request for the data storage apparatus to determine whether authorization information is required to process a document stored in the data storage apparatus, the command comprises a request for the data storage apparatus to determine whether input authorization information matches authorization information of a document stored in the data storage apparatus, when the command has not been successfully processed, response data is received from the data storage apparatus, which includes error information indicating a type of error occurred, and the means for parsing converts the error information into a format understandable by the data management apparatus, and further comprising, means for transmitting the generated command as a SOAP message; and means for receiving response data as the SOAP message.

14. The data management apparatus as claimed in claim 13, further comprising:

means for displaying interpreted response data on a display unit.

15. The data management apparatus as claimed in claim 13, wherein the data storage apparatus includes a facsimile transmission unit, and the command comprises a request for the facsimile transmission unit to transmit a document stored in the data storage apparatus.

16. The data management apparatus as claimed in claim 13, wherein the data storage apparatus includes a scanner distribution unit, and the command comprises a request for the scanner distribution unit to distribute a document stored in the data storage apparatus.

17. The data management apparatus as claimed in claim 13, wherein the structured document format is extensible markup language format.

18. A data management apparatus connected to a data storage apparatus via a network, comprising:

a graphical user interface configured to receive a user's command comprising a request for said data storage apparatus to transmit a list of documents stored therein and one or more conditions for the list of documents; and a controller configured to convert the user command received by the graphical user interface to a command of structured document format for the data storage apparatus, the command of said structured document format being understandable by said data storage apparatus, transmit the generated command to the data storage apparatus through the network, receive through the network response data of the structured document format transmitted by the data storage apparatus in response to reception of the transmitted command, and interpret the received response data into a format understandable by a particular application program installed in the data management apparatus, wherein said command comprises a request for said data storage apparatus to determine whether authorization information is required to process a document stored in said data storage apparatus, and said command comprises a request for said data storage apparatus to determine whether input authorization information matches authorization information of a document stored in said data storage apparatus, when the command has not been successfully processed, the response data includes error information indicating a type of error occurred, and the controller is configured to convert the error information into a format understandable by the particular application program installed in the data management apparatus, and wherein the controller is configured to transmit the generated command as a SOAP message, and receive the response data written as a SOAP message from the data storage apparatus.

19. The apparatus as claimed in claim 1, wherein said data storage apparatus includes a printing unit, and said command comprises a request for said printing unit to print a document stored in said data storage apparatus.

20. The apparatus as claimed in claim 6, wherein said data storage apparatus includes a printing unit, and said command comprises a request for said printing unit to print a document stored in said data storage apparatus.

21. The computer program as claimed in claim 7, wherein said data storage apparatus includes a printing unit, and said command comprises a request for said printing unit to print a document stored in said data storage apparatus.

22. The method as claimed in claim 12, wherein said data storage apparatus includes a printing unit, and said command comprises a request for said printing unit to print a document stored in said data storage apparatus.

23. The apparatus as claimed in claim 13, wherein said data storage apparatus includes a printing unit, and said command comprises a request for said printing unit to print a document stored in said data storage apparatus.

24. The apparatus as claimed in claim 18, wherein said data storage apparatus includes a printing unit, and said command comprises a request for said printing unit to print a document stored in said data storage apparatus.

* * * * *